(12) United States Patent
Muraoka et al.

(10) Patent No.: US 6,353,727 B1
(45) Date of Patent: Mar. 5, 2002

(54) IMAGE FORMING APPARATUS HAVING STAPLE PROCESSING SECTION

(75) Inventors: Toshinori Muraoka; Yoshio Sugishima; Kazuhisa Kondo; Ippei Miyahira; Keiji Okumura, all of Osaka (JP)

(73) Assignee: Kyocera Mita Corporation, Osaka (JP)

( * ) Notice: Subject to any disclaimer, the term of this patent is extended or adjusted under 35 U.S.C. 154(b) by 38 days.

(21) Appl. No.: 09/638,396

(22) Filed: Aug. 15, 2000

(30) Foreign Application Priority Data

Aug. 16, 1999 (JP) .......................... 11-229963
Aug. 27, 1999 (JP) .......................... 11-241884

(51) Int. Cl.[7] .............................. G03G 15/00
(52) U.S. Cl. ................................ 399/410
(58) Field of Search .............. 399/410, 408, 399/407, 124, 405

(56) References Cited

U.S. PATENT DOCUMENTS

| 4,652,112 A | * | 3/1987 | Randall ................. 399/402 |
| 4,763,167 A | * | 8/1988 | Watanabe et al. ........... 347/155 |
| 5,398,918 A | * | 3/1995 | Rizzolo et al. .......... 270/58.08 |
| 5,442,432 A | * | 8/1995 | Tani ......................... 399/410 |

FOREIGN PATENT DOCUMENTS

| JP | 04-336293 | * | 11/1992 |
| JP | 08-301509 | * | 11/1996 |
| JP | 09-183563 | * | 7/1997 |

* cited by examiner

Primary Examiner—Robert Beatty
(74) Attorney, Agent, or Firm—Smith, Gambrell & Russell, LLP

(57) ABSTRACT

In the present invention, a staple processing section for collectively stapling a predetermined number of paper sheets, on which an image have been fixed, is contained in a main body housing containing an image forming section, a transfer section, a fixing section, and a conveying path. The staple processing section is integrated with a main body of an image forming apparatus, so that the degree of freedom of design of the paper conveying path is increased, the appearance of the main body of the image forming apparatus can neatly be designed.

9 Claims, 19 Drawing Sheets

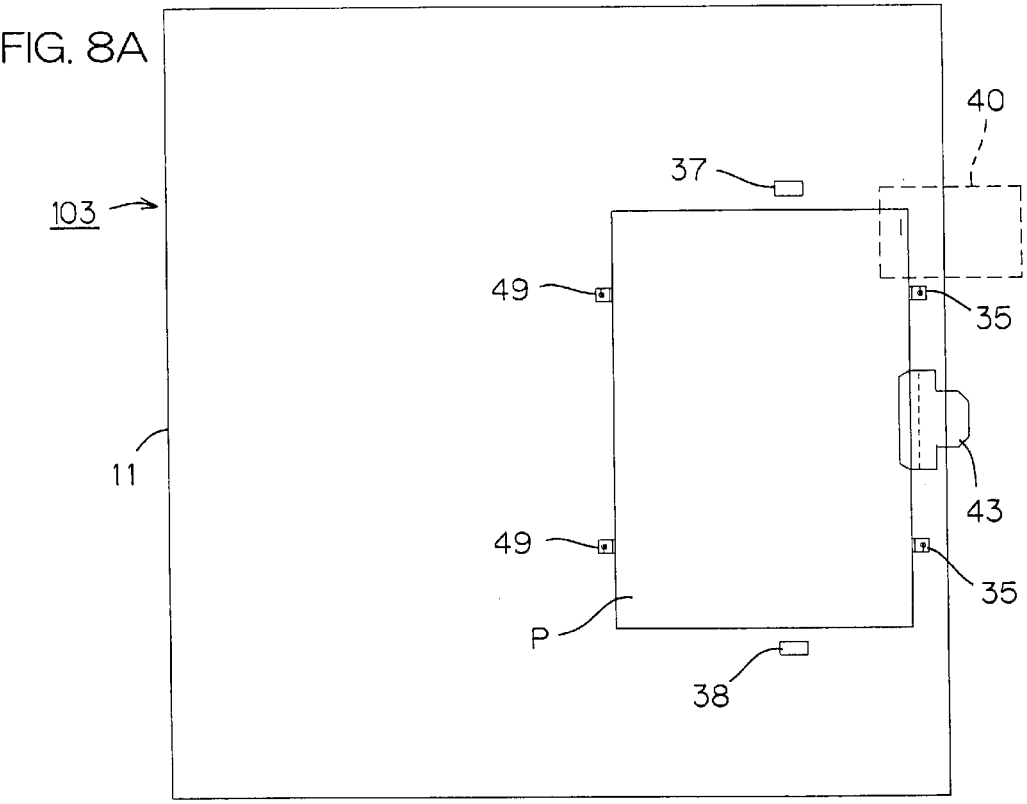
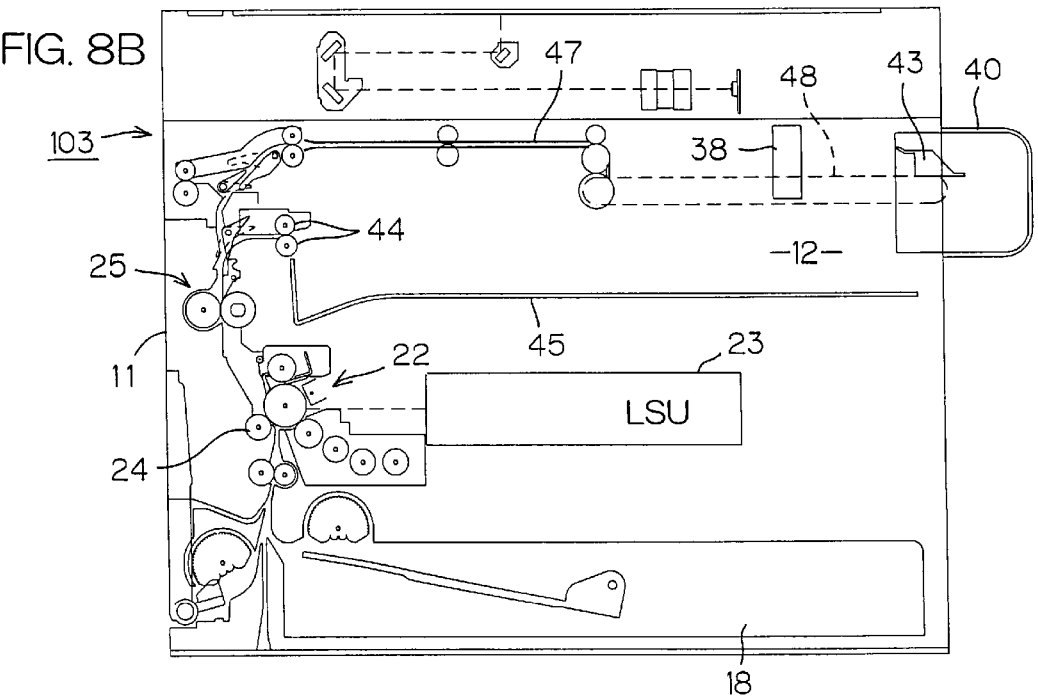

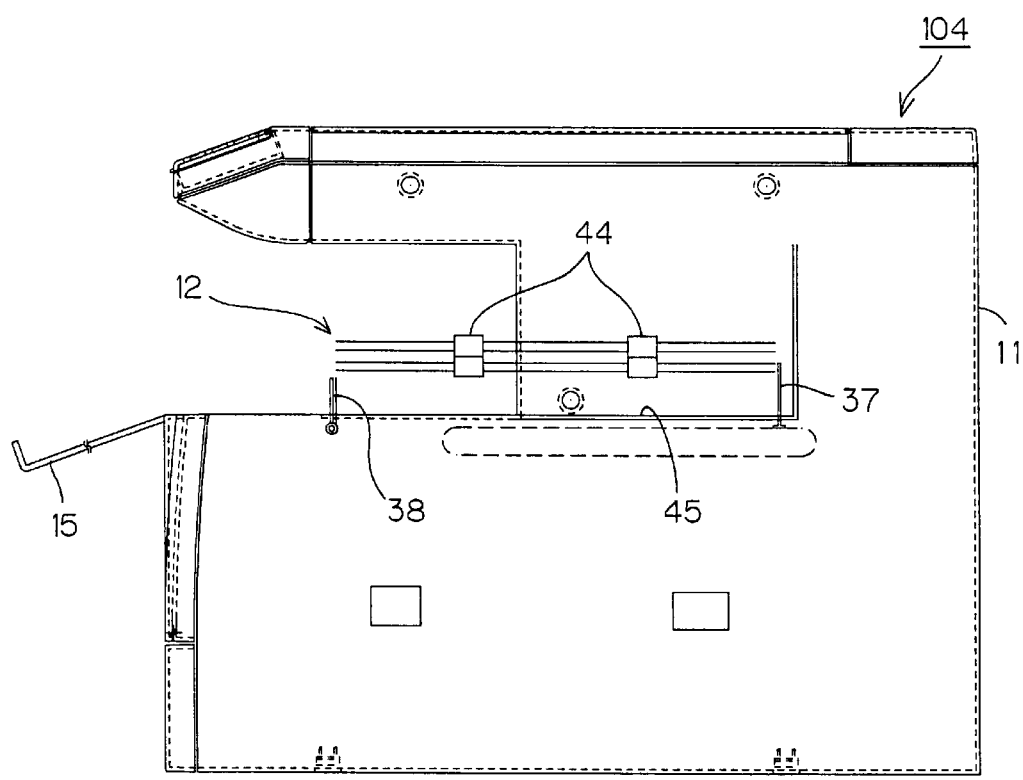

IMAGE FORMING APPARATUS HAVING STAPLE PROCESSING SECTION

This application is based on applications No. 11-229963 and No. 11-241884 filed in Japan, the contents of which are incorporated herein by reference.

BACKGROUND OF THE INVENTION

1. Field of the Invention

The present invention relates generally to an image forming apparatus such as a copying machine or a printer for forming an image by an electrophotographic system, and more particularly, to an image forming apparatus having a staple processing function for collectively binding a plurality of paper sheets each having an image formed thereon by staples.

2. Description of Related Art

Conventionally, staple processors for binding a predetermined number of paper sheets each having an image formed thereon by an image forming apparatus by staples have been commercially available. A conventional staple processor 2 is so constructed that it is attached to the left or the right of a main body 1 of the image forming apparatus, as shown in FIG. 17. The paper sheets each having the image formed thereon inside the main body 1 of the image forming apparatus are inverted by a switchback path 3 and are conveyed into the staple processor 2, where the paper sheets are subjected to staple processing, and are discharged onto a discharge tray 4.

In the conventional construction, when the paper sheets are jammed inside the main body 1 of the image forming apparatus, to relieve the jam of the paper sheets, the staple processor 2 must be so displaced as to be separated from the main body 1 of the image forming apparatus, as shown in FIG. 18.

When the staple processor 2 is separated from the main body 1 of the image forming apparatus, as shown in FIG. 18, however, the main body 1 of the image forming apparatus is liable to upset.

In order to solve such a problem, such construction as to not directly mount the staple processor 2 on the main body 1 of the image forming apparatus but construction using a mounting stand 5, as shown in FIG. 19, has also been known.

In the construction using the mounting stand 5, when the height of the main body 1 of the image forming apparatus is changed by stacking a paper cassette in a lower part of the main body 1 of the image forming apparatus, for example, the height of the staple processor 2 must also be changed. Therefore, the height of the mounting stand 5 must be able to be adjusted, so that the cost of the image forming apparatus rises.

Furthermore, in either the construction shown in FIG. 17 or the construction shown in FIG. 19, the staple processor 2 is connected to a side part of the main body 1 of the image forming apparatus, so that a setting area for the overall apparatus increases.

In a method of inverting, when the paper sheets are conveyed from the main body 1 of the image forming apparatus to the staple processor 2, the paper sheets by the switchback path 3 and conveying the inverted paper sheets, it takes time to convey the paper sheets. When an attempt to perform staple processing is made after forming an image on a lot of paper sheets, the processing speed is low.

Furthermore, the staple processor 2 is provided with a plurality of bins in which the paper sheets are respectively stacked. After the image forming processing is terminated, the plurality of paper sheets are respectively stacked in the plurality of bins, and then, the paper sheets which have been stacked in the bins are respectively subjected to stapling processing. In the main body 1 of the image forming apparatus, therefore, the staple processor 2 is not operated until a series of image forming processing is all terminated. When a lot of sets of copies are made, therefore, the termination of all the copies must be waited for in order to perform staple processing. Even when it is desired to take out and confirm one of the sets of copies which have been made, therefore, the termination of binding processing of all of the copies must be waited for.

In the conventional staple processor 2, two staplers are contained when two portions of the paper sheets are bound. Therefore, the staple processor 2 increases in size and cost.

The present invention has been made in order to solve such a problem, and has for its object to provide an image forming apparatus of new construction having a staple processing function.

Another object of the present invention is to provide an image forming apparatus which does not increase in its setting space, easily perform jam processing, and has a staple processing function.

Still another object of the present invention is to provide an image forming apparatus having a staple processing function, which is high in image formation speed and staple processing speed for a lot of paper sheets.

The present invention provides a staple processor which is conveniently used and is simple in construction.

Furthermore, the present invention provides a staple processing method capable of binding a plurality of portions using one stapler with simple construction.

SUMMARY OF THE INVENTION

In an image forming apparatus having an image forming section for forming a toner image, a transfer section for transferring the formed toner image on paper sheets, a fixing section for fixing the toner image transferred to the paper sheets, and a main body housing containing a conveying path for conveying the paper sheets such that the toner image is transferred and fixed, the present invention is characterized in that a staple processing section for collectively binding the predetermined number of paper sheets, on which the image has been fixed, by staples is contained in the main body housing.

According to the present invention, the staple processing section is contained in the main body housing. Accordingly, the staple processing section is integrated with the main body housing. Therefore, a setting space for the overall apparatus may be smaller, as compared with the conventional apparatus having such construction that the staple processor is externally attached to the main body housing.

Furthermore, when the paper sheets are jammed inside the main body housing, the paper jam may be relieved by opening the main body housing. The staple processing section need not be detached from the main body housing, for example. Accordingly, there is no possibility that at the time of jam relieving processing, the balance of the main body housing is not maintained, so that the main body housing is liable to upset, for example.

The staple processing section is contained in the main body housing. Accordingly, the conveying path for introducing the paper sheets, on which the toner image has been fixed, into the staple processing section can be freely designed, thereby making it possible to improve the conveyance efficiency. When an image is formed on a lot of paper sheets to perform staple processing, therefore, the processing speed of the apparatus can be increased.

A paper bundle, which has been subjected to staple processing, may be discharged onto the paper receiving tray projecting from the main body housing. The apparatus is not so constructed that the paper sheets are discharged onto the paper receiving tray, and are then subjected to staple processing, as in the conventional example. Accordingly, the number of paper receiving trays may be one, thereby simplifying the construction of the apparatus.

The main body housing may be provided with a paper stacking space. The paper sheets, which are not subjected to staple processing, are discharged into the paper stacking space. On the other hand, the paper bundle, which has been subjected to staple processing, are discharged onto the paper receiving tray projecting from the main body housing. Accordingly, the paper bundle which has been subjected to staple processing and the paper sheets which are not subjected to staple processing are discharged into separate discharge sections, so that the image forming apparatus is conveniently used.

When the paper bundle which has been subjected to staple processing is discharged into the paper stacking space, the paper receiving tray receiving the paper bundle does not project from the main body housing. Accordingly, a blank space need not be provided around the image forming apparatus, so that a setting space for the image forming apparatus may be small.

The paper bundle which has been subjected to staple processing may be fed to the paper receiving tray on an upper surface of the main body housing. Accordingly, the paper receiving tray does not project from the main body housing, so that the whole shape of the image forming apparatus can be made neat.

If the paper sheets stacked in the paper stacking space are subjected to staple processing, a space for stacking the paper sheets need not be provided inside the main body housing. Accordingly, the whole image forming apparatus can be miniaturized.

The paper sheets of small size, for example, can be also satisfactorily subjected to staple processing. Moreover, the paper sheets, which have been subjected to staple processing, are stacked in the paper stacking space. Accordingly, the image forming apparatus can be conveniently used.

The present invention is further directed to a staple processor, characterized by comprising stacking means in which a plurality of paper sheets each having an image formed thereon are stacked; a stapler for binding the paper sheets stacked in the stacking means; moving means for moving the stacked paper sheets while making respective one sides, which are to be bound, of the stacked paper sheets parallel to the stapler; and control means for stopping, when the paper sheets are at a predetermined position relative to the stapler, the movement of the paper sheets by the moving means to operate the stapler.

Furthermore, the present invention is directed to a method of binding the stacked paper sheets by a stapler, characterized by comprising the steps of moving the stacked paper sheets while making respective one sides, which should be bound, of the paper sheets parallel to a stapler fixedly arranged; stopping, when a position, which should be bound, determined along the respective one sides of the paper sheets are opposed to the stapler, the movement of the paper sheets to operate the stapler; further moving the paper sheets, to stop the movement of the paper sheets when another position, which should be bound, of the paper sheets are opposed to the stapler to operate the stapler; and repeating the movement and the stop of the paper sheets and the operation of the stapler, as required, to bind the plurality of portions of the paper sheets using the stapler along the respective one sides, which should be bound, of the paper sheets.

In the staple processor, the paper sheets are moved by the moving means. At this time, the respective one sides, which should be bound, of the paper sheets are moved along the stapler. Therefore, desired positions on the respective one sides, which should be bound, of the paper sheets can be opposed to the stapler. When a desired position is opposed to the stapler, the movement of the paper sheets is stopped, so that the stapler is operated. Accordingly, binding processing can be performed at the desired positions of the paper sheets.

The moving means is constituted by a front-side lining-up member, a width lining-up member, and so forth of paper sheets which are provided in the stacking means, for example, so that the moving means is integrated with the stacking means, thereby making it possible to simplify the construction of the apparatus.

Since the stacked paper sheets are moved, the movement thereof is easy. The stapler can be fixedly arranged, thereby simplifying the construction of the apparatus.

According to the method in the present invention, the plurality of portions of the paper sheets can be satisfactorily bound using one stapler. Therefore, there can be provided a method of various staple processings for binding the desired portions of the paper sheets while using a simple structure called one stapler.

As described in the foregoing, according to the present invention, there can be provided a staple processor which is simple in construction and is conveniently used and a staple processing method.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 2A is a plan view, and FIG. 2B is a front view;

FIG. 4A is a plan view, and FIG. 4B is a front view;

FIG. 6A is a plan view, and FIG. 6B is a front view;

FIGS. 8A and 8B are diagrams showing the internal construction which characterizes a copying machine 103 according to still another embodiment of the present invention, where FIG. 8A is a plan view, and FIG. 8B is a front view;

FIG. 9A is a plan view, and FIG. 9B is a front view;

FIG. 10 is an illustration as viewed from a right side of the copying machine 104 shown in FIG. 9;

DESCRIPTION OF PREFERRED EMBODIMENTS

Figure 1:
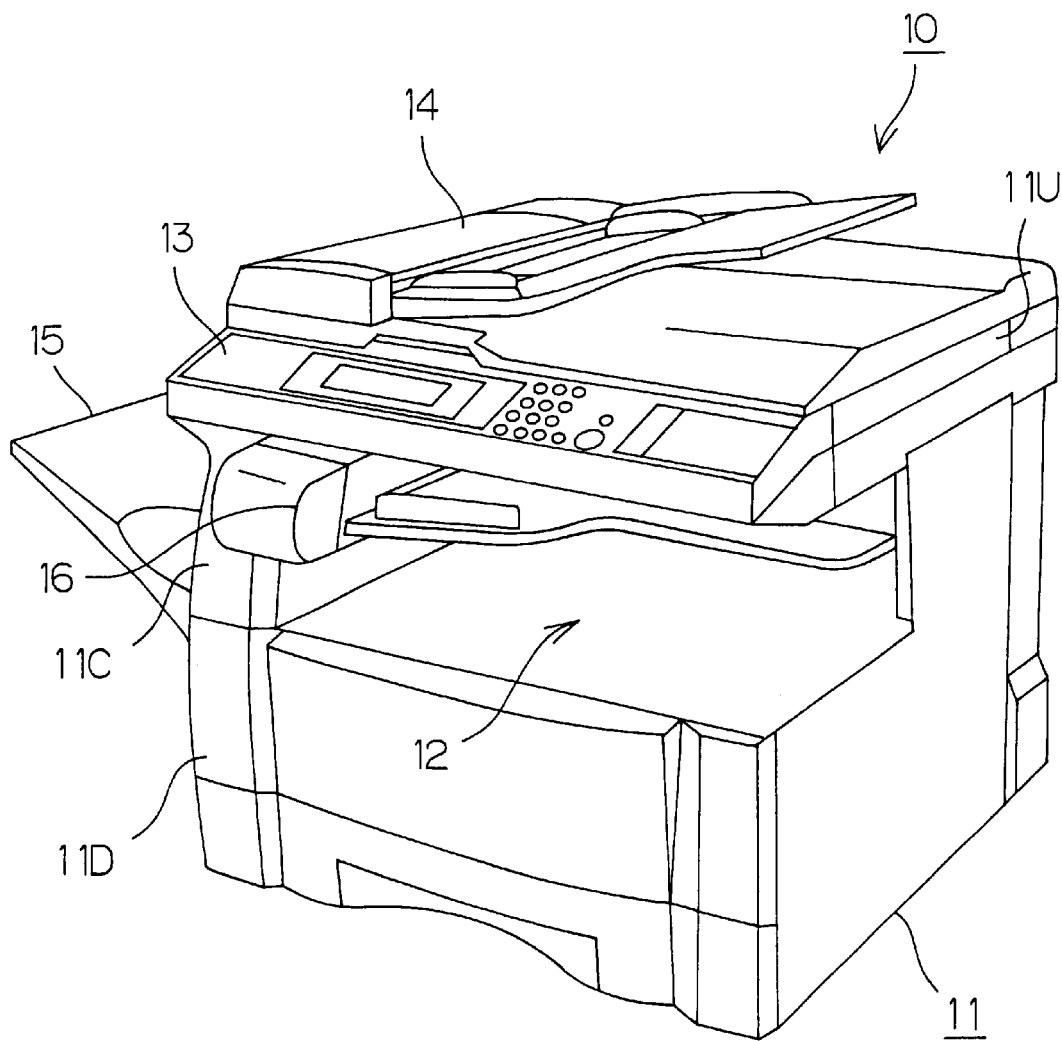
FIG. 1 is a perspective view showing the external construction of a copying machine 10 serving as an image forming apparatus according to an embodiment of the present invention.

FIG. 1 is a perspective view showing the external construction of a copying machine 10 serving as an image forming apparatus according to an embodiment of the present invention.

Referring to FIG. 1, the external form of the copying machine 10 is partitioned by a main body housing 11. The main body housing 11 has a stacking space 12 formed in a vertically intermediate portion of the housing, entering inside thereof in an approximately horizontal direction. Therefore, the main body housing 11 has a lower housing 11D, an upper housing 11U, and a connecting housing 11C.

The upper housing 11U contains a reading mechanism for reading a document. Further, an operation panel 13 is provided on the front side of the upper housing 11U. Further, in the present embodiment, a document feeder 14 for automatically conveying the document is mounted above the upper housing 11U.

The lower housing 11D contains a paper tray, and a conveying path for taking out the paper sheets from the paper tray and conveying the paper sheets. Further, it also contains an image forming section for forming a toner image, and a transfer section for transferring the formed toner image to the paper sheets. Further, a fixing section for fixing the toner image transferred to the paper sheets is contained in a portion where the lower housing 11D connects with the connecting housing 11C.

A paper receiving tray 15 onto which a paper bundle which has been subjected to staple processing, described later, is discharged projects toward a left side surface of the main body housing 11.

The copying machine 10 according to the present embodiment is characterized in that a staple processing section 16 for collectively stapling the predetermined number of paper sheets, on which the image has been fixed, is contained in the main body housing 11. The staple processing section 16 hardly projects from the main body housing 11 by being contained in the main body housing 11. Accordingly, the copying machine 10 can be made high in setting stability. Further, the external construction of the copying machine 10 can be made neat.

Figure 2A:
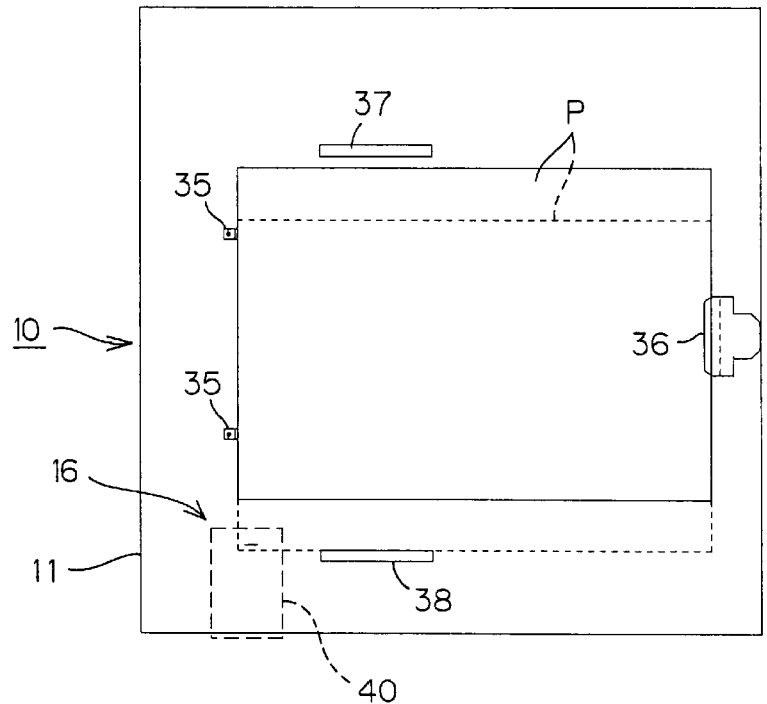
FIGS. 2A and 2B are diagrams showing the internal construction which characterizes the copying machine 10 according to the embodiment of the present invention, where
Figure 2B:
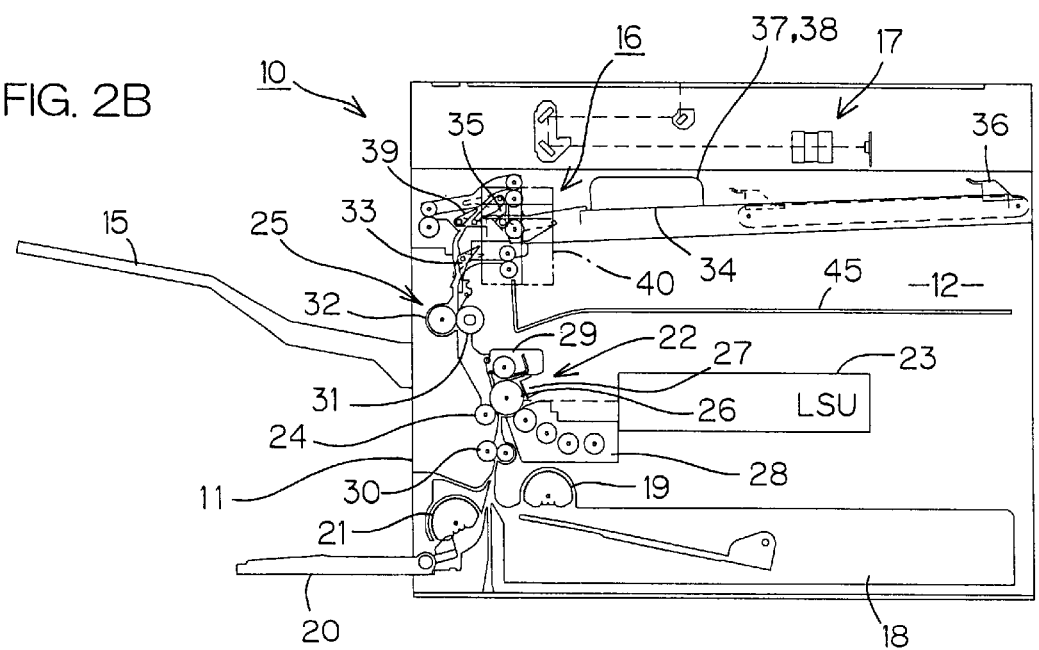

FIGS. 2A and 2B are diagrams showing the internal construction which characterizes the copying machine 10 according to this embodiment of the present invention, where FIG. 2A is a plan view, and FIG. 2B is a front view.

Referring to FIG. 2B, the main body housing 11 in the copying machine 10 has a document reading mechanism 17 provided in its uppermost part and has a paper cassette 18 provided in its lower part. Paper sheets contained in the paper cassette 18 are fed one at a time by a delivery roller 19. A manual paper feeding tray 20 which can be opened or closed is provided in a lower part on a left side surface of the main body housing 11. The paper sheets set in the manual paper feeding tray 20 are also fed one at a time by a delivery roller 21.

The main body housing 11 contains an image forming unit 22, a laser scanning unit 23, a transfer roller 24, and a fixing device 25. The image forming unit 22 has a photosensitive drum 26 for forming an electrostatic latent image, a main charger 27 for charging the surface of the photosensitive drum 26, a developer unit 28 for developing, after the surface of the photosensitive drum 26 is exposed by the laser scanning unit 23 to form an electrostatic latent image, the electrostatic latent image by toner particles, and a cleaner 29 for cleaning the surface of the photosensitive drum 26 to which a toner image has been transferred. The paper sheets which are delivered one at a time from the paper cassette 18 or the manual paper feeding tray are conveyed between the photosensitive drum 26 and the transfer roller 24 after the timing of the conveyance is adjusted by a registration roller 30. Consequently, the toner image on the surface of the photosensitive drum 26 is transferred to the paper sheets. The paper sheets, to which the toner image has been transferred, are fed to the fixing device 25, where the toner image is fixed. The fixing device 25 has a heat roller 31 and a pressure roller 32. The paper sheets are heated and pressed by the pair rollers, to fix the toner image.

A paper discharge switching claw 33 is provided on the downstream side of the fixing device 25 (on the downstream side as viewed in the direction of paper conveyance and on the upper side in FIG. 2B). The switching claw 33 is switched to a state indicated by a broken line, thereby introducing the paper sheets fed from the fixing device 25 to the stacking space 12 in the main body housing 11. On the other hand, the switching claw 33 introduces the paper sheets fed from the fixing device 25 to the staple processing section 16 when it is switched to a state indicated by a solid line. The staple processing section 16 comprises a paper stacking tray 34, a stopper 35 for lining up rear ends of the paper sheets, a forward drawing member 36 for aligning the paper sheets along the stopper 35, width lining-up members 37 and 38 for lining up the widths of the paper sheets, a branch lever 39, and a stapler 40.

FIGS. 3A to 3I are diagrams for explaining the operation of the staple processing section 16 shown in FIGS. 2A and 2B. Referring now to FIGS. 2A, 2B, and 3A to 3I, the operation of the staple processing section 16 will be described.

When the staple processing section 16 is not operated, the paper discharge switching claw 33 is switched so as to introduce the paper sheets each having the image formed thereon to the stacking space 12. Further, the branch lever 39 is in a state shown in FIG. 3A.

Figure 3A:
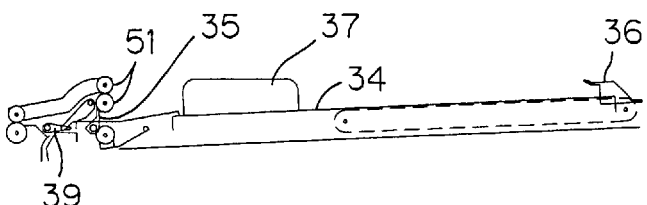
FIGS. 3A to 3I are diagrams for explaining the operation of a staple processing section 16 shown in FIGS. 2A and 2B.
Figure 3B:
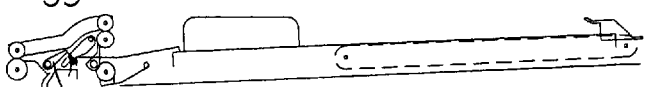

When staple processing is set by the operation panel 13 (see FIG. 1) in the state shown in FIG. 3A, a stand-by state shown in FIG. 3B occurs. In the stand-by state, the branch lever 39 is rotated, to enter a state where the paper sheets each having the image formed thereon can be discharged onto the tray 34. The branch lever 39 is switched, and the paper discharge switching claw 33 is also switched so as to introduce the paper sheets into the staple processing section 16.

Figure 3C:
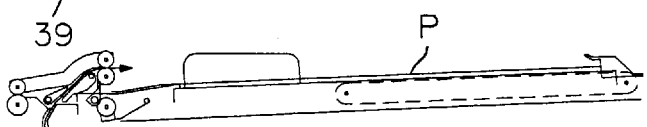

The paper sheet P discharged from the fixing device 25 is also discharged onto the tray 34, as shown in FIG. 3C, by the discharge roller 51. When the paper sheet P is discharged onto the tray 34, the forward drawing member 36 presses a front end of the paper sheet, to line up the paper sheet P such that its rear end is applied to the stopper 35 (FIG. 3D).

The width lining-up member 37 contained in a rear part of the main body housing 11 is operated, so that the paper sheet P is drawn toward the front of the main body housing 11. The paper sheet P is set in a position, where it can be stapled, determined by the front-side width lining-up member 38 upon being applied to the width lining-up member 38 (FIG. 3E).

Figure 3D:
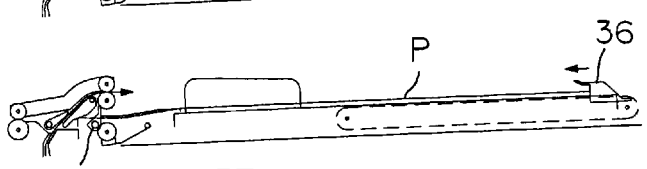
Figure 3E:
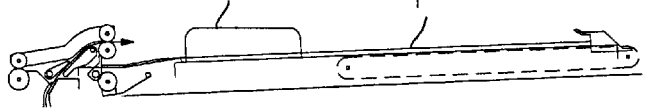
Figure 3F:
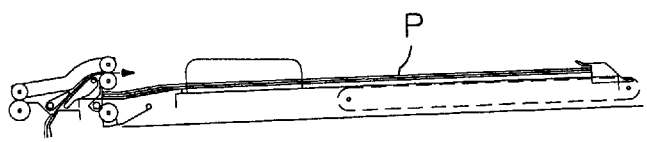

Every time the paper sheet P having the image formed thereon is discharged onto the tray 34, the processing shown in FIGS. 3C, 3D, and 3E is repeated. Consequently, the paper sheets P on the tray 34 are set at a position where they can be stapled (FIG. 3F).

The stapler 40 (whose illustration is omitted in FIGS. 3A to 3I) is operated in order to staple the paper sheets P by the previously inputted number of paper sheets.

Figure 3G:
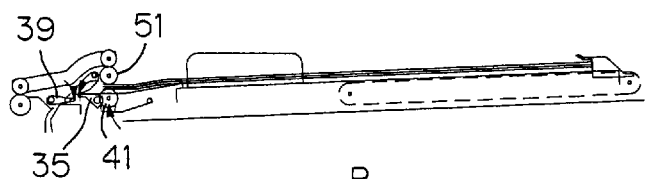
Figure 3H:
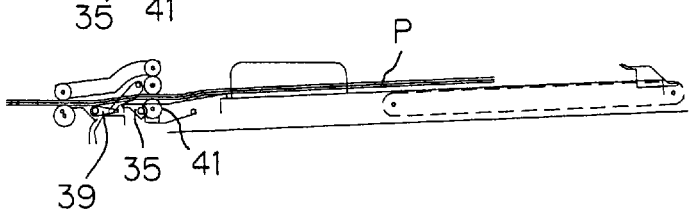
Figure 3I:
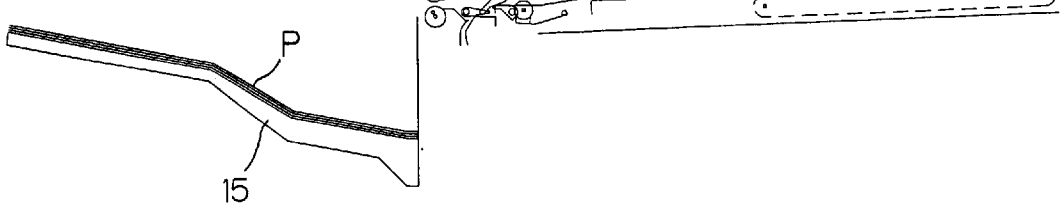

Thereafter, in order to discharge a stapled paper bundle P, the stopper 35 is rotated, and the branch lever 39 is also rotated. A pressure roller 41 is displaced, so that the paper bundle P is brought into a state where it can be conveyed in cooperation with the discharge roller 51 (FIG. 3G). The discharge roller 51 is rotated, so that the paper bundle P is conveyed in a direction opposite to the direction of discharge, and is discharged onto the paper receiving tray 15 (FIGS. 3H and 3I).

In the present embodiment, every time the paper sheet P is discharged onto the tray 34, the width lining-up member 37 is operated, so that the paper sheet P is set at a position where it can be stapled. The paper bundle P is subjected to staple processing using the stapler 40, and is then returned rearward by the front-side width lining-up member 38. Thereafter, the paper bundle P is discharged.

However, in FIG. 2A, the stopper 35 is thrown down with the paper bundle P set at a position where it can be stapled on the front side of the main body housing so that the paper bundle is movable leftward. At this time, the paper bundle P may be fed leftward by a desired amount by the forward drawing member 36, and stopped once to be stapled. Consequently, it is possible to subject a plurality of portions of the paper bundle to staple processing.

Specifically, one stapler 40 is contained in the main body housing 11. The stapler 40 is fixedly arranged. On the other hand, the discharged paper bundle is movable from the stapler 40. Such construction that a plurality of portions of the paper bundle can be stapled using one stapler fixedly arranged by changing the relative position between the stapler 40 and the paper bundle may be used.

Figure 4A:
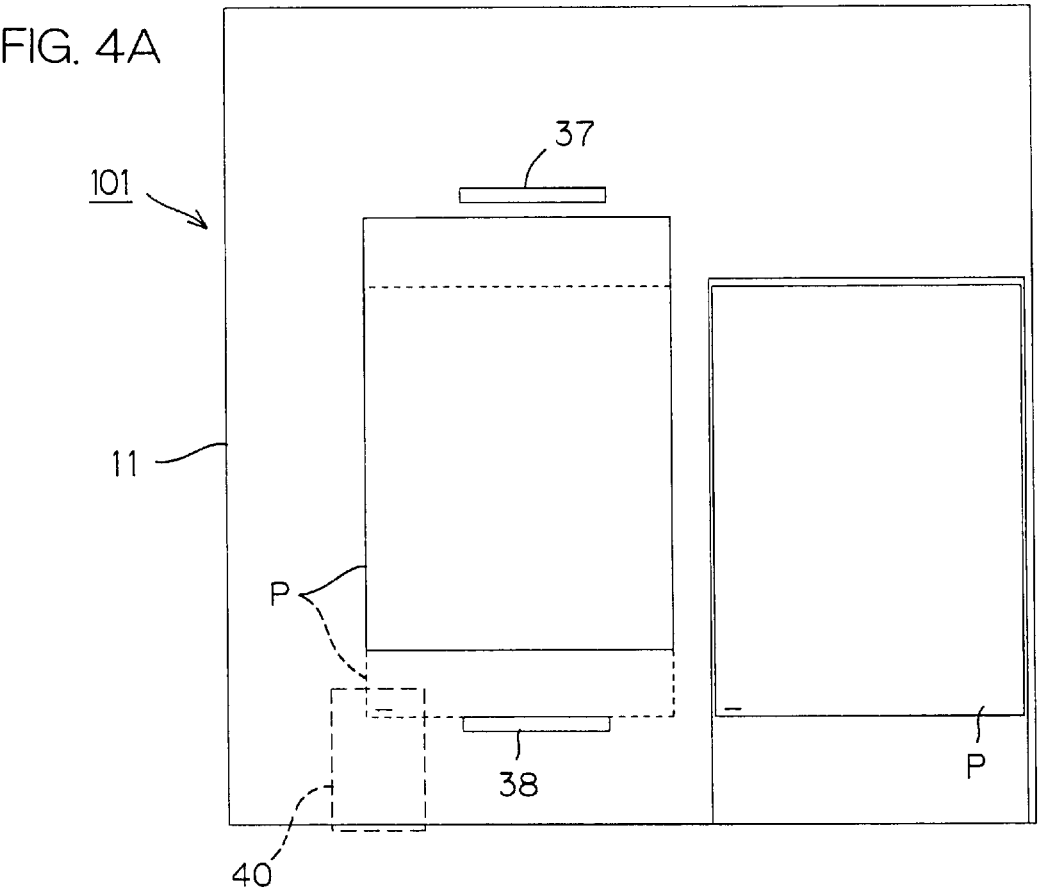
FIGS. 4A and 4B are diagrams showing the internal construction which characterizes a copying machine 101 according to another embodiment of the present invention, where
Figure 4B:
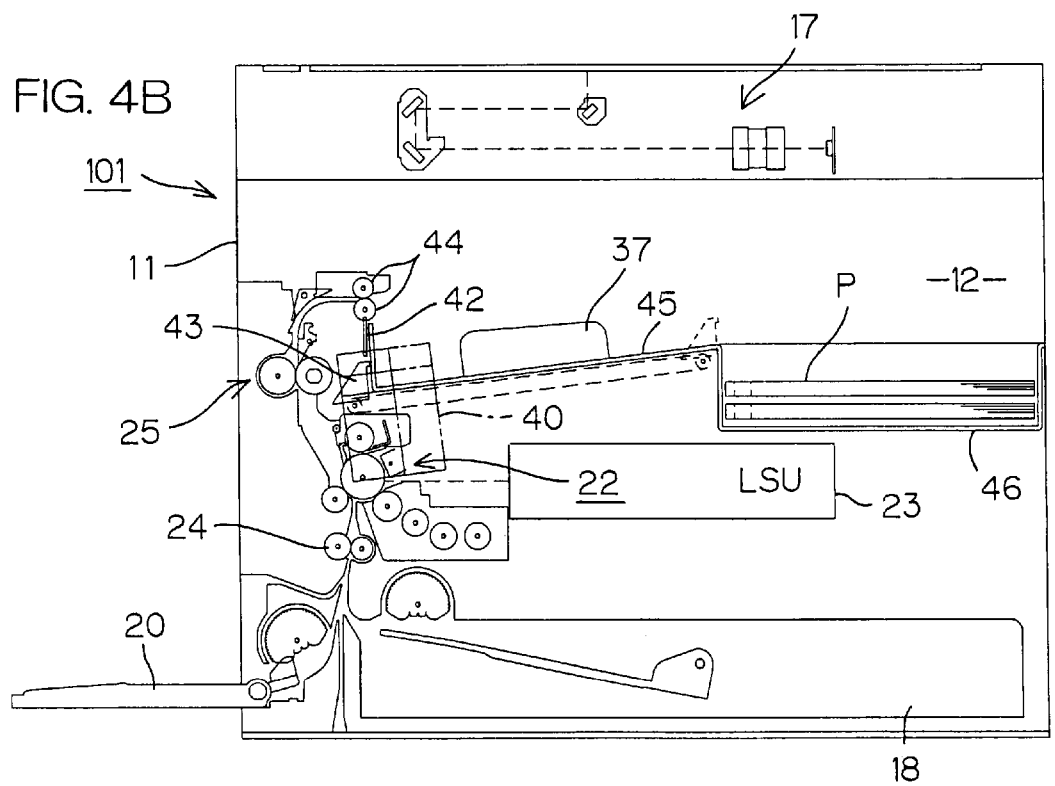

FIGS. 4A and 4B are diagrams showing the internal construction which characterizes a copying machine 101 according to another embodiment of the present invention, where FIG. 4A is a plan view, and FIG. 4B is a front view.

The copying machine 101 shown in FIGS. 4A and 4B is characterized in that paper sheets which have been stapled in a staple processing section 16 are discharged into a stacking space 12 formed in a main body housing 11.

The staple processing section 16 according to the present embodiment comprises a forward drawing paddle 42 and a transfer plate 43.

The other construction is the same as the construction shown in FIGS. 2A and 2B. Therefore, the same or corresponding portions are assigned the same reference numerals and hence, the description thereof is not repeated.

Figure 5A:
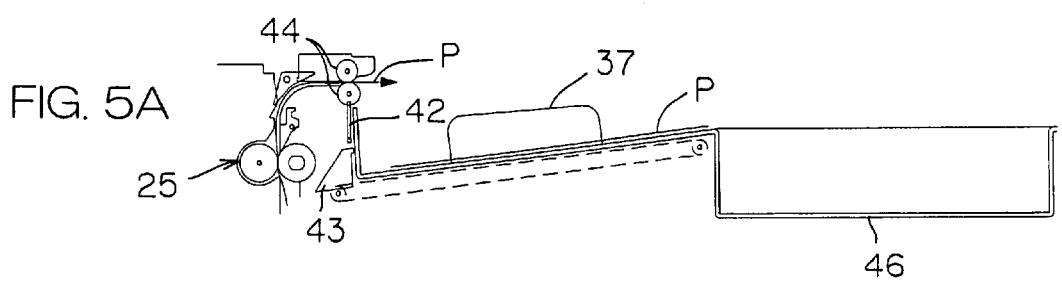
FIGS. 5A to 5G are diagrams for explaining the operation of a staple processing section 16 in the copying machine 101 shown in FIGS. 4A and 4B.
Figure 5B:
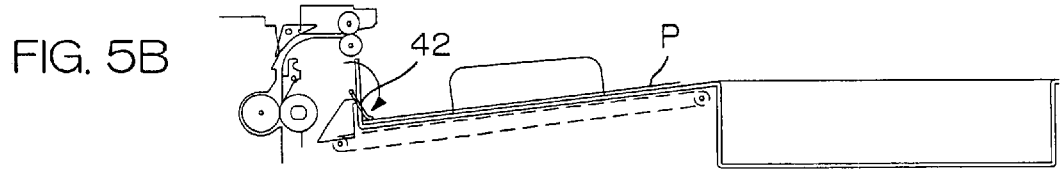
Figure 5C:
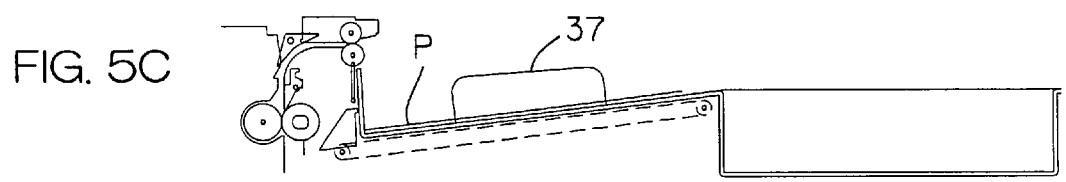
Figure 5D:
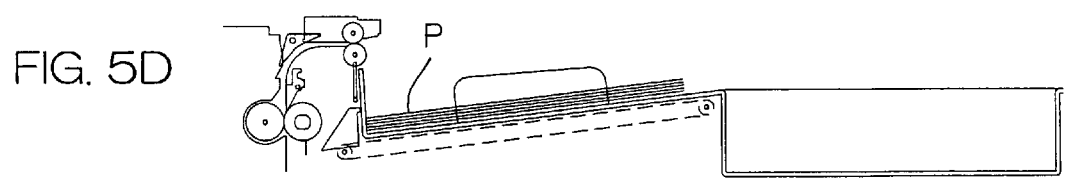
Figure 5E:
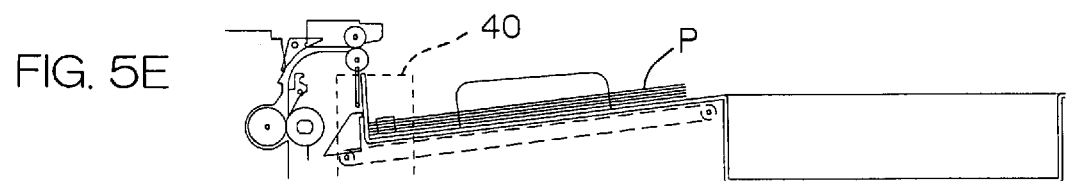
Figure 5F:
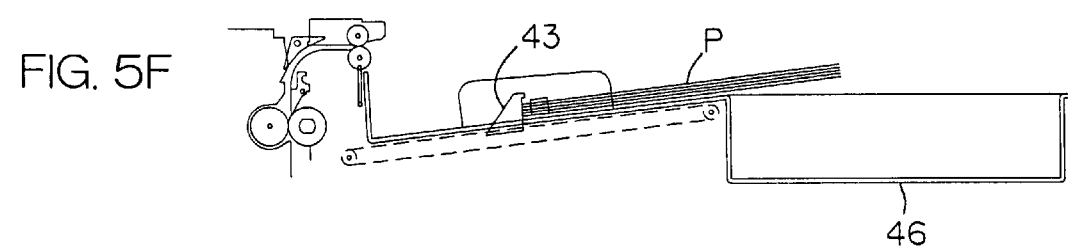
Figure 5G:
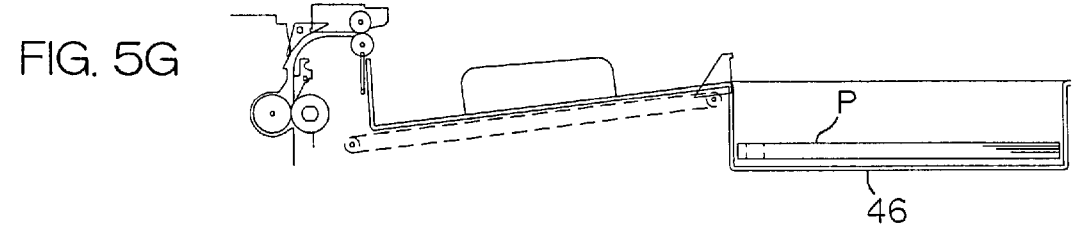

FIGS. 5A and 5G are diagrams for explaining the operation of the staple processing section 16 in the copying machine 101. Referring now to FIGS. 4A, 4B, and 5A to 5G, the operation of the staple processing section 16 will be described.

The paper sheet delivered from a fixing device 25 is discharged onto a tray 45 by a discharge roller 44. The tray 45 is a tray provided in the stacking space 12 (see FIG. 1).

When the paper sheet is discharged onto the tray 45, the forward drawing paddle 42 is rotated, so that a rear end of the discharged paper sheet is drawn leftward, and the position of the rear end is then lined up with a stopper (FIGS. 5A and 5B). A rear-side width lining-up member 37 is then moved forward, so that the front side of the paper sheet is lined up with a front-side width lining-up member 38. In the present embodiment, the front-side width lining-up member 38 is fixedly arranged, not move.

The operation shown in FIGS. 5B and 5C, corresponding to a predetermined number of paper sheets, is repeated, so that a desired number of paper sheets are stacked on the tray 45 (FIG. 5D). The stacked paper sheets are at a position where they can be stapled using a stapler 40 (see FIGS. 4A and 4B). Therefore, staple processing is performed using the stapler 40 (FIG. 5E).

A transfer plate 43 is then moved rightward, so that the paper sheets on the tray 45 are discharged onto a stacking tray 46. The stacking tray 46 is provided in the stacking space 12, as already described, so that it can be visually recognized from the outside of the main body housing 11. A user can take out a paper bundle which has been discharged onto the stacking tray 46 by reaching his hand. The present embodiment is effective for cases such as a case where an image is formed on paper sheets of A4 size in the JIS standard (paper sheets which are not of large size).

Figure 6A:
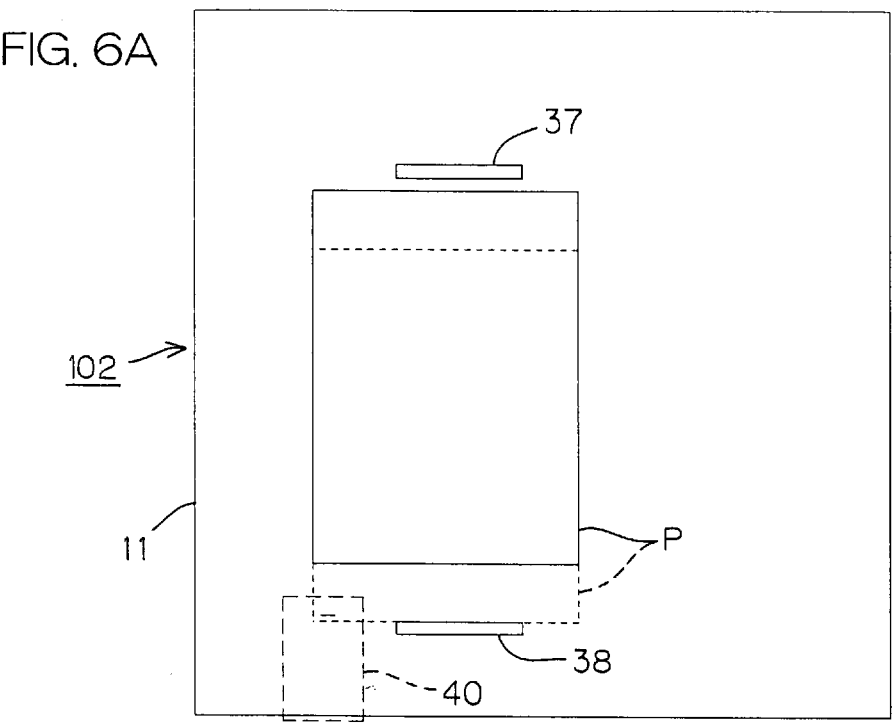
FIGS. 6A and 6B are diagrams showing the internal construction which characterizes a copying machine 102 according to still another embodiment of the present invention, where
Figure 6B:
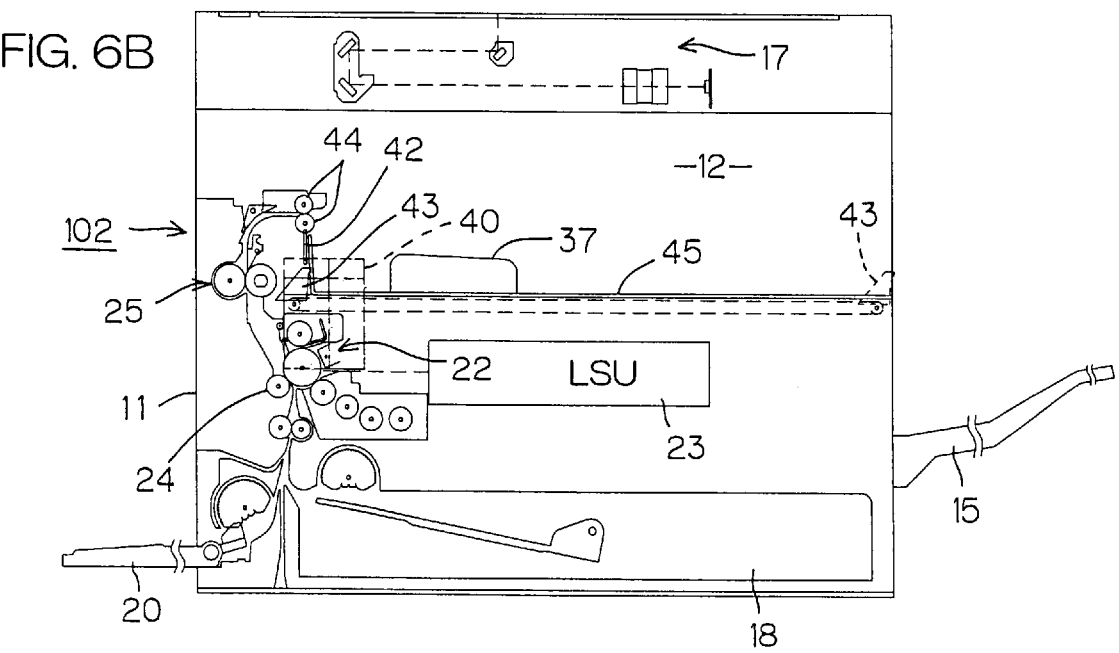

FIGS. 6A and 6B are diagrams showing the internal construction which characterizes a copying machine 102 according to still another embodiment of the present invention, where FIG. 6A is a plan view, and FIG. 6B is a front view. Also in the copying machine 102, the same or corresponding portions as those described in FIGS. 2A and 2B are assigned the same reference numerals and hence, the description thereof is not repeated.

The copying machine 102 is characterized in that both paper sheets which are subjected to staple processing and paper sheets which are not subjected to staple processing are discharged into a stacking space 12, the paper sheets discharged into the stacking space 12 are subjected to staple processing, and a paper bundle, which has been subjected to staple processing, is discharged not into the stacking space 12 but onto a paper receiving tray 15 provided on a side surface of the copying machine 102, the direction of discharge of the paper sheets.

In FIG. 6B, reference numeral 42 denotes a forward drawing paddle, and reference numeral 43 denotes a transfer plate.

FIGS. 7A to 7G are diagrams for explaining the operation of a staple processing section 16 in the copying machine 102 shown in FIGS. 6A and 6B Referring now to FIGS. 6A, 6B, and 7A to 7G, the operation of the staple processing section 16 will be described.

The paper sheets delivered from a fixing device 25 are discharged one at a time onto a tray 45 by a discharge roller 44. The tray 45 is a tray formed in the stacking space 12 for receiving the discharged paper sheets.

Figure 7A:
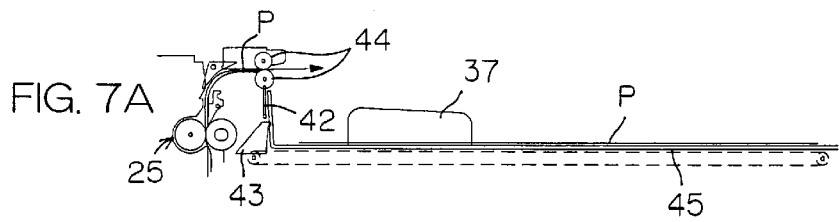
FIGS. 7A to 7G are diagrams for explaining the operation of a staple processing section 16 in the copying machine 102 shown in FIGS. 6A and 6B.
Figure 7B:
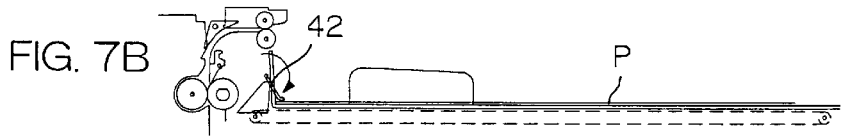

Every time one of the paper sheets is discharged onto the tray 45, the forward drawing paddle 42 is rotated, so that the paper sheet is lined up with its rear end applied to a stopper, as shown in FIG. 7B. A width lining-up member 37 provided in a rear part of a main body housing 11 is moved forward, so that the paper sheet is lined up at a position where it can be stapled using a stapler 40 (FIG. 7C).

Figure 7C:
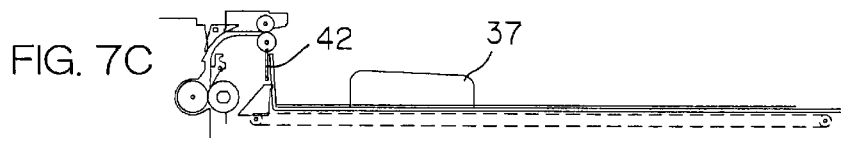
Figure 7D:
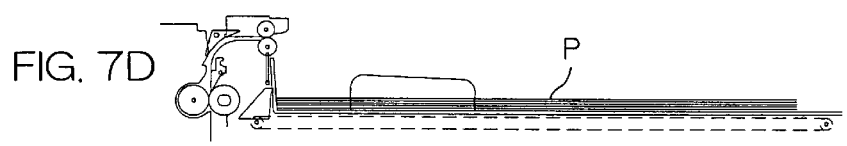
Figure 7E:
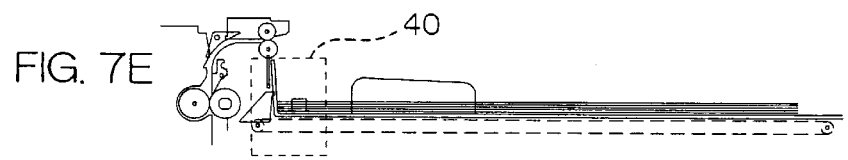

The operation shown in FIGS. 7B and 7C is repeated a predetermined number of times, so that a predetermined number of paper sheets enter a state where they are lined up on the tray 45 at the position where they can be stapled. The paper sheets are stapled using a stapler 40 (FIG. 7E).

Figure 7F:
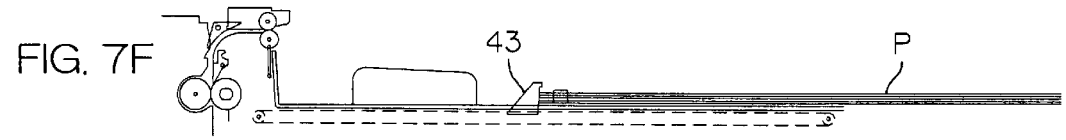
Figure 7G:
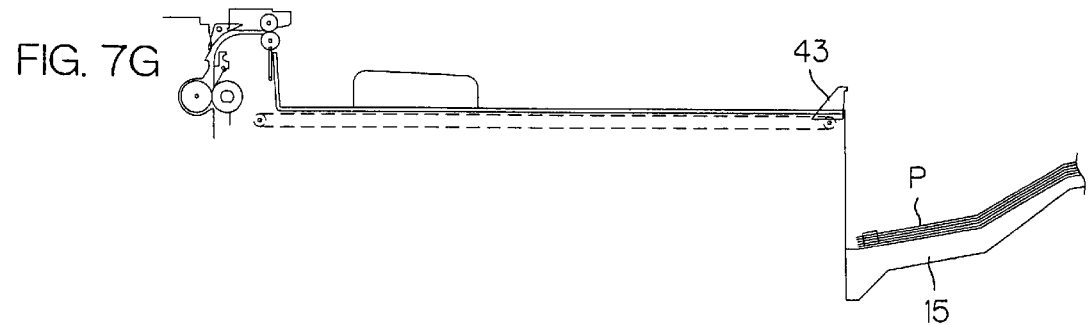

A transfer plate 43 is then operated, so that a paper bundle which has been stapled is fed rightward on the tray 45, and is delivered to the paper receiving tray 15 projecting toward the outside of the main body housing 11 (FIGS. 7F and 7G).

In the present embodiment, the paper sheets which are not subjected to staple processing are discharged onto the tray 45, and a user takes out the paper sheets.

FIGS. 8A and 8B are diagrams for explaining the internal construction which characterizes a copying machine 103 according to still another embodiment of the present invention, where FIG. 8A is a plan view, and FIG. 8B is a front view.

The construction of the copying machine 103 shown in FIGS. 8A and 8B is characterized in that a paper bundle which has been subjected to staple processing is discharged onto a tray 45 in a stacking space 12, and a staple processing section 16 is provided above the tray 45. The staple processing section 16 has a conveying path 47 for feeding paper sheets to be subjected to staple processing toward the right of a main body housing 11. The conveying path 47 is contained in an upper part of the tray 45. The paper sheets to be subjected to staple processing are stacked in a tray 48. Width lining-up members 37 and 38, a stopper 35, and a forward drawing member 49 are provided around the tray 48, causing the paper sheets to be positioned in a stapler 40. In the present embodiment, the stapler 40 is accommodated in the main body housing 11 with a part thereof projecting from the housing in view of a relationship with the paper size.

The paper sheets which have been subjected to staple processing using the stapler 40 are fed by a transfer plate 43 to be discharged onto the tray 45 inside the stacking space 12.

Figure 9A:
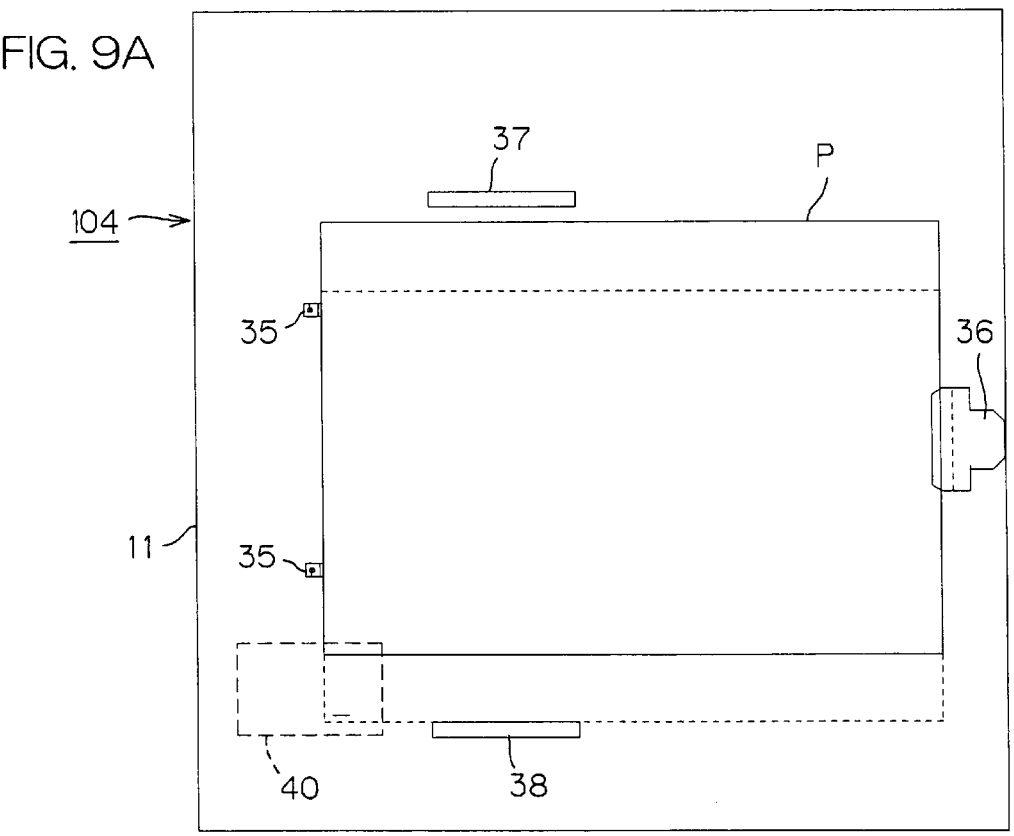
FIGS. 9A and 9B are diagrams showing the internal construction which characterizes a copying machine 104 according to still another embodiment of the present invention, where
Figure 9B:
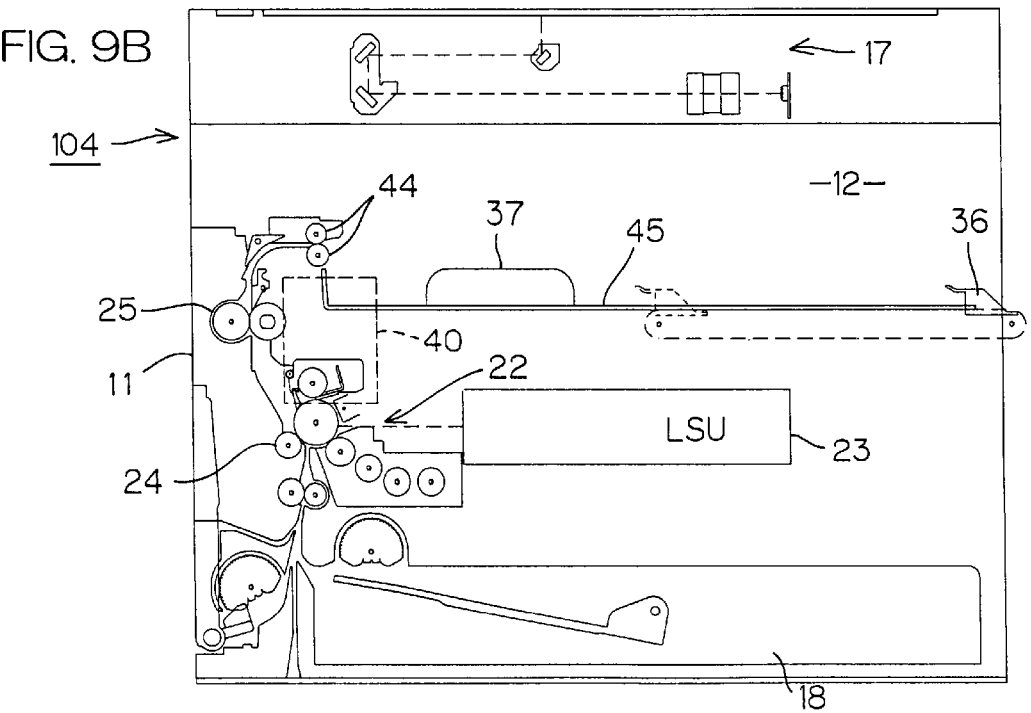

FIGS. 9A and 9B are diagrams showing the internal construction which characterizes a copying machine 104 according to still another embodiment of the present invention, where FIG. 9A is a plan view, and FIG. 9B is a front view. Further, FIG. 10 is an illustration as viewed from a right side surface of the copying machine 104 shown in FIGS. 9A and 9B.

The copying machine 104 shown in FIGS. 9A, 9B, and 10 is characterized in that paper sheets discharged into a stacking space 12 in a main body housing 11 can be subjected to staple processing, and the paper sheets which have been subjected to staple processing are discharged toward the front of the main body housing 11. Consequently, a paper receiving tray 15 does not project toward both right and left sides of the main body housing 11, and a blank space may not be provided on both right and left sides of the main body housing 11. Accordingly, the copying machine can be made high in use efficiency of a space.

In the present embodiment, a plurality of portions of a paper bundle can be subjected to staple processing using one stapler 40.

A tray 45 is provided in the stacking space 12 in the main body housing 11, and the paper sheets each having an image formed thereon are discharged one at a time onto the tray 45. The discharged paper sheets are positioned such that their rear sides are along a stopper 35 by a forward drawing member 36. Further, they are positioned such that their front sides are along a front-side width lining-up member 38 by a rear-side width lining-up member 37.

This is repeated for each of the discharged paper sheets, so that a paper bundle consisting of the predetermined number of paper sheets is positioned at a position where it can be stapled. After a staple processing is performed once, the front-side width lining-up member 38 is then thrown down, so that the rear side of the paper bundle is pressed forward by the rear-side width lining-up member 37. When the paper bundle is shifted to a predetermined position, the paper bundle is stopped once and the stapler 40 is operated again, a plurality of portions of the paper bundle can be subjected to staple processing.

If the rear-side width lining-up member 37 is finally displaced toward the forefront of the main body housing 11, the paper bundle which has been subjected to staple processing is discharged onto the paper receiving tray 15 provided on a front surface of the main body housing 11.

Figure 11:
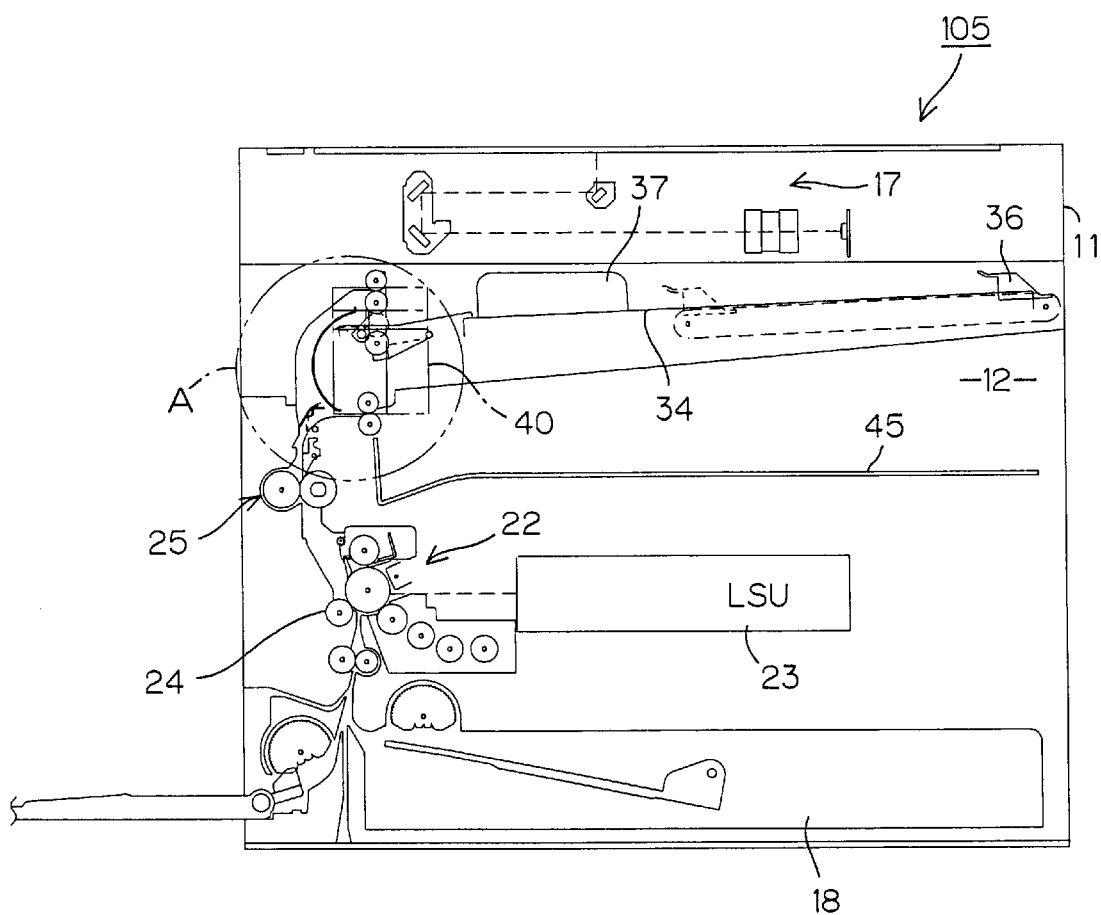
FIG. 11 is a front view showing the internal construction of a copying machine 105 according to still another embodiment of the present invention.
Figure 12:
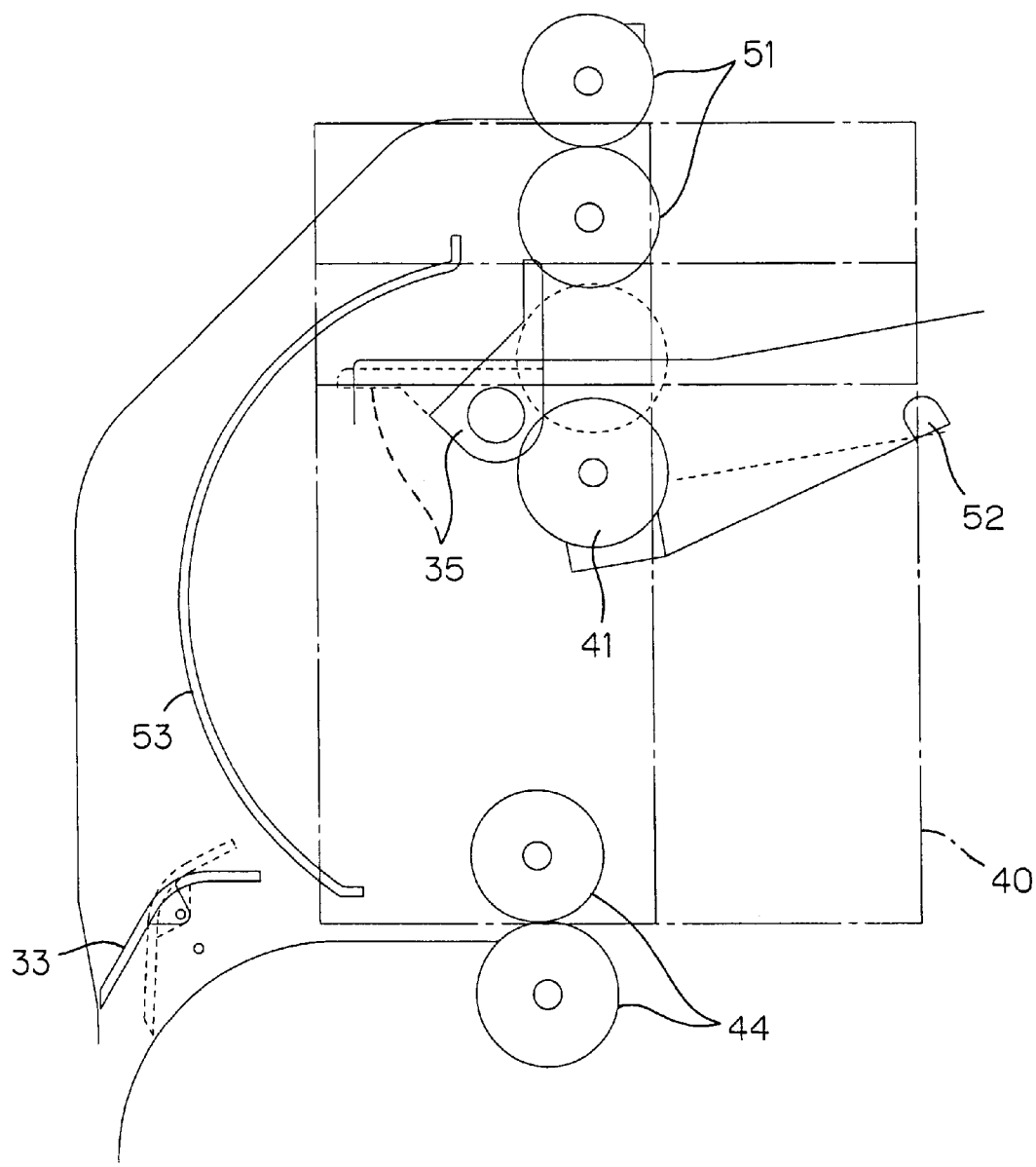
FIG. 12 is a diagram showing the construction of a principal part of FIG. 11.

FIG. 11 is a front view showing the internal construction of a copying machine 105 according to still another embodiment of the present invention. FIG. 12 is a diagram showing the construction of a principal part of FIG. 11.

The construction of the copying machine 105 shown in FIG. 11 is similar to the construction of the copying machine 10 shown in FIGS. 2A and 2B except that paper sheets which have been subjected to staple processing in a staple processing section 16 are not discharged toward the left side of a main body housing 11, and a paper bundle which has been subjected to staple processing is inverted and is discharged onto a tray 45 in a stacking space 12.

In the copying machine 105, the same or corresponding portions as those in the construction of the copying machine 10 are assigned the same reference numerals and hence, the description thereof is not repeated.

As shown in FIG. 12, there is provided a paper discharge switching claw 33 for choosing whether the paper sheets delivered from a fixing device 25 should be introduced into the tray 45 or should be introduced into the staple processing section 16. The paper sheets introduced into the staple processing section 16 are discharged onto a tray 34 by a discharge roller 51. Further, there is provided a pressure roller 41 for conveying the paper sheets which have been subjected to staple processing from the tray 34. The pressure roller 41 is swingable around a supporting point 52, and can convey a relatively thick paper bundle with the paper bundle interposed between the pressure roller 41 and the discharge roller 51. A stopper 35 positions respective rear ends of the paper sheets to be subjected to staple processing, and rotates to a state indicated by a broken line to convey the paper bundle. Further, there is provided a guide 53 for inverting the paper bundle by 180°.

Figure 13A:
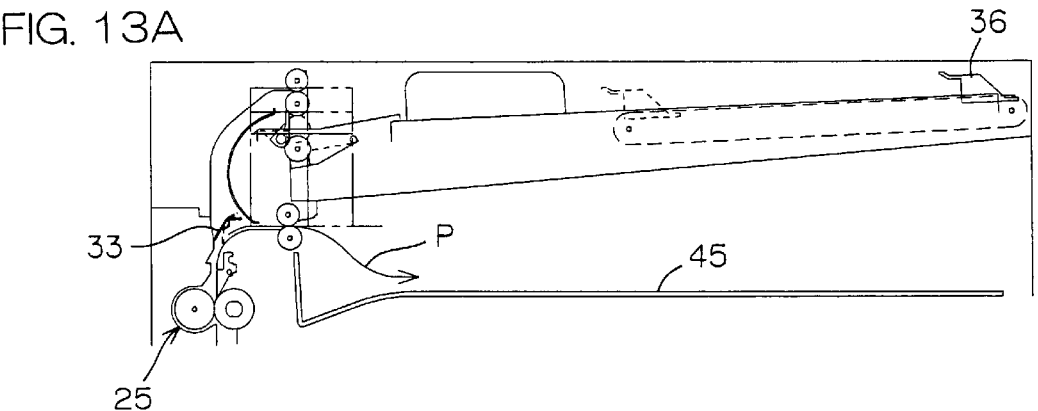
FIGS. 13A to 13C are diagrams for explaining the operation of the copying machine 105 shown in FIGS. 11 and 12.
Figure 13B:
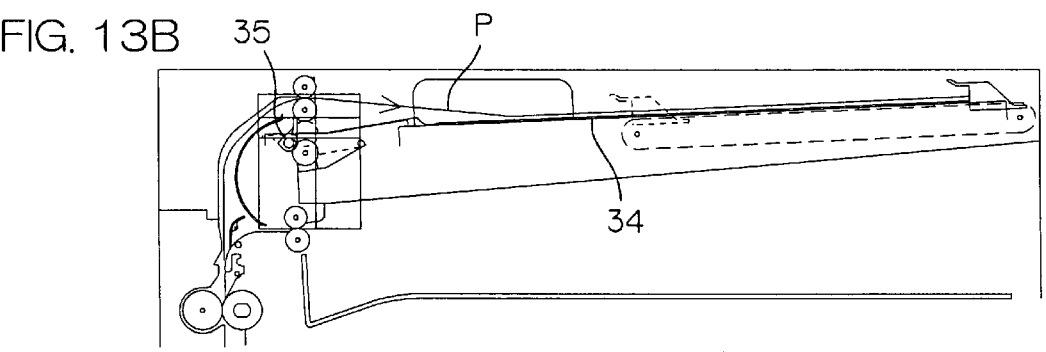
Figure 13C:
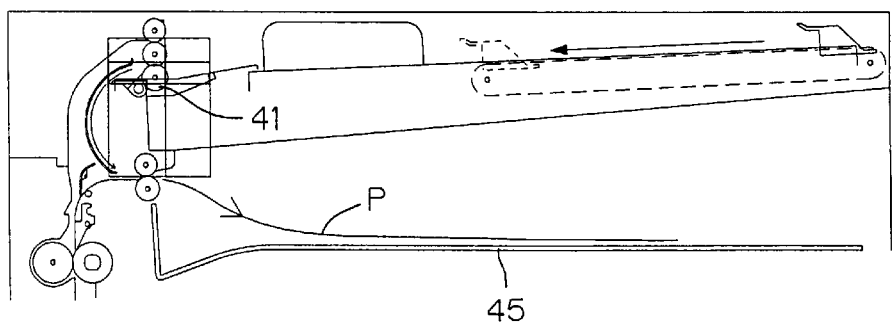

FIGS. 13A to 13C are diagrams for explaining the operation of the copying machine 105 shown in FIGS. 11 and 12.

As shown in FIG. 13A, the paper sheets delivered from the fixing device 25 are discharged one at a time onto the tray 45 in the stacking space 12 through a discharge roller by the switching claw 35 when they are not subjected to staple processing.

On the other hand, as shown in FIG. 13B, the switching claw 33 is switched at the time of the staple processing, so that the paper sheets move upward from the fixing device 25, and are discharged onto the tray 34 by the discharge roller 51. Every time the paper sheet is discharged, the paper sheet is positioned at a position where it can be stapled by a forward drawing member 36 and width lining-up members 37 and 38. When the predetermined number of paper sheets are stacked, they are subjected to staple processing using a stapler.

Thereafter, the stopper 35 is thrown down, so that the pressure roller 41 is displaced. The paper bundle is interposed between the discharge roller and the pressure roller, is guided by the guide 53, and is discharged onto the tray 45 in the stacking space 12.

When the paper bundle is thick, it does not easily pass between discharge roller and the pressure roller. Accordingly, it is preferable that the discharge roller is constituted by a roller whose width is displaceable.

Figure 14:
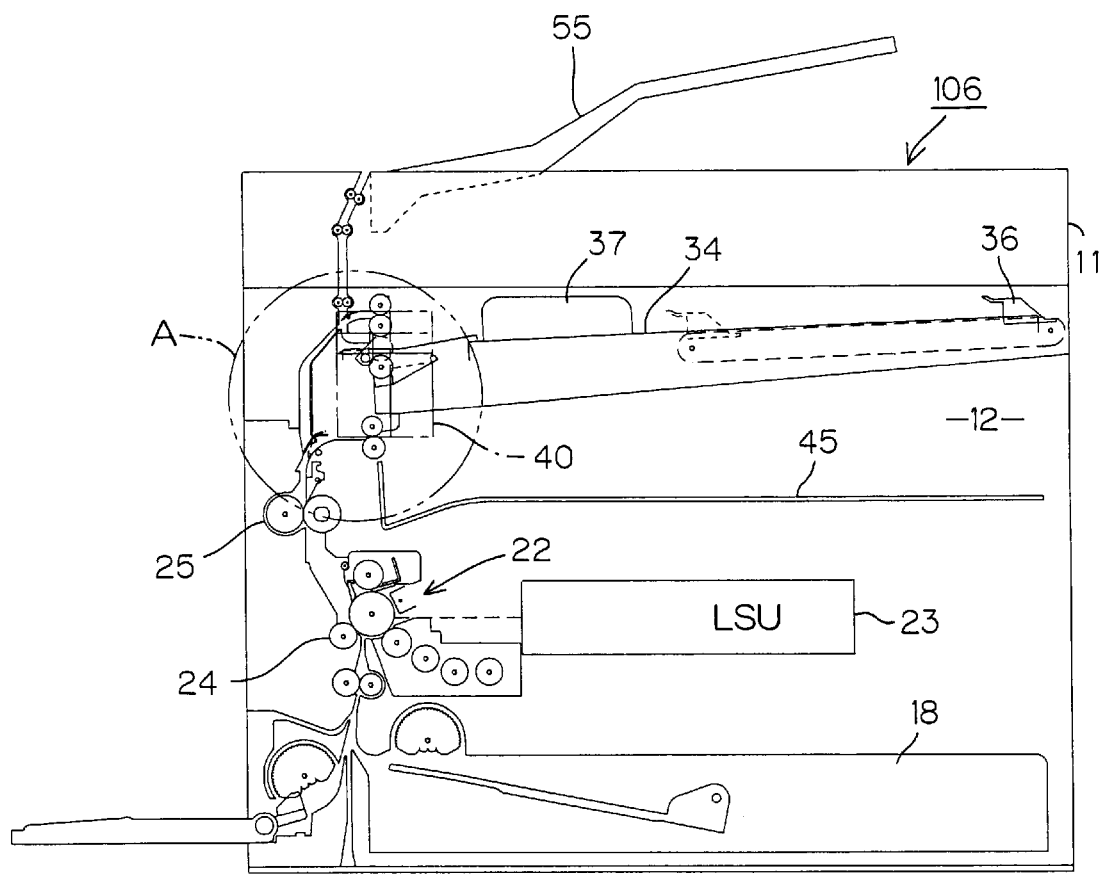
FIG. 14 is an internal front view for explaining construction which characterizes a printer 106 according to still another embodiment of the present invention.
Figure 15:
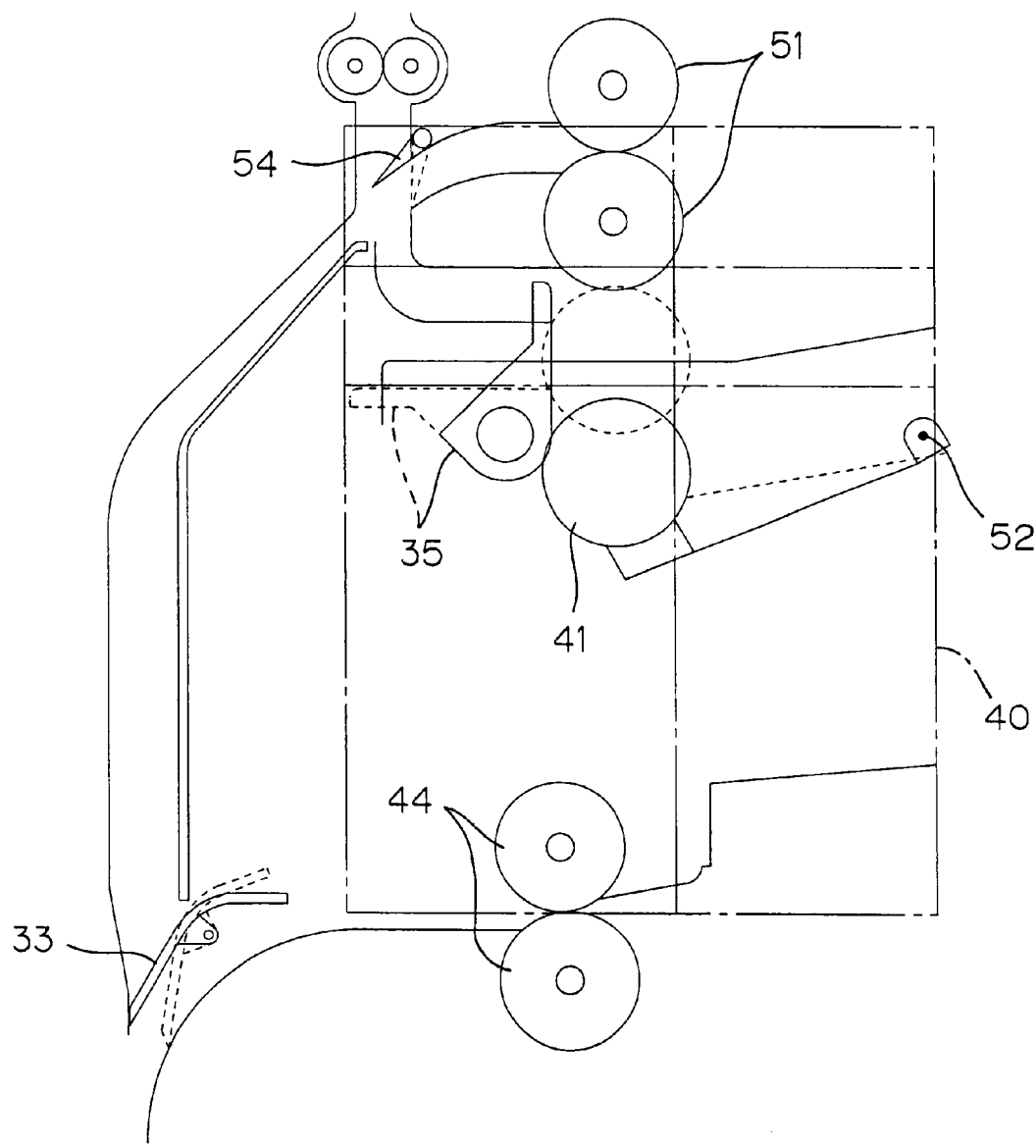
FIG. 15 is an enlarged view showing a principal part of FIG. 14.

FIG. 14 is an internal front view for explaining construction which characterizes a printer 106 according to still another embodiment of the present invention, FIG. 15 is an enlarged view showing a principal part of FIG. 14, and FIGS. 16A to 16C are diagrams for explaining the operation of the printer 106. The printer 106 shown in FIGS. 14 to 16C is characterized in that a staple processing section 16 is contained in a main body housing 11, paper sheets which have been subjected to staple processing in the staple processing section 16 are discharged onto an upper surface of the main body housing 11, and the paper sheets which are not subjected to staple processing are discharged into a stacking space 12 formed inside the main body housing 11.

Therefore, a paper conveying path can be switched by construction shown in FIG. 15.

In FIGS. 14 and 15, reference numeral 33 denotes a paper discharge switching claw, reference numeral 35 denotes a stopper, and reference numeral 41 denotes a pressure roller. They are the same as those in the construction described in FIGS. 11 and 12.

Figure 16A:
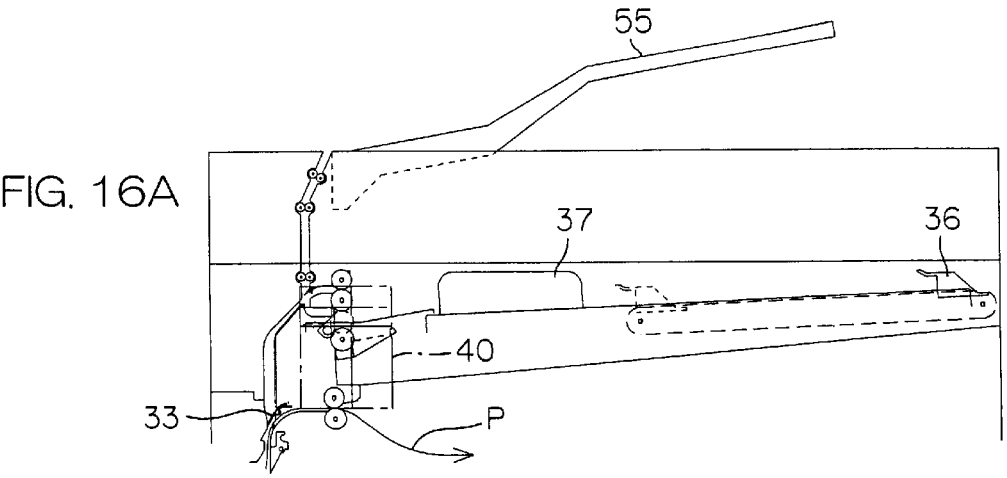
FIGS. 16A to 16C are diagrams for explaining the operation of the printer 106.
Figure 16B:
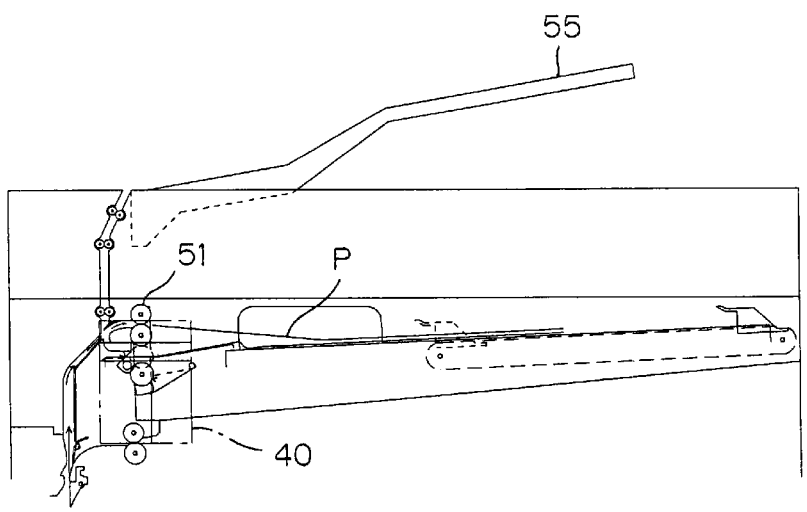
Figure 16C:
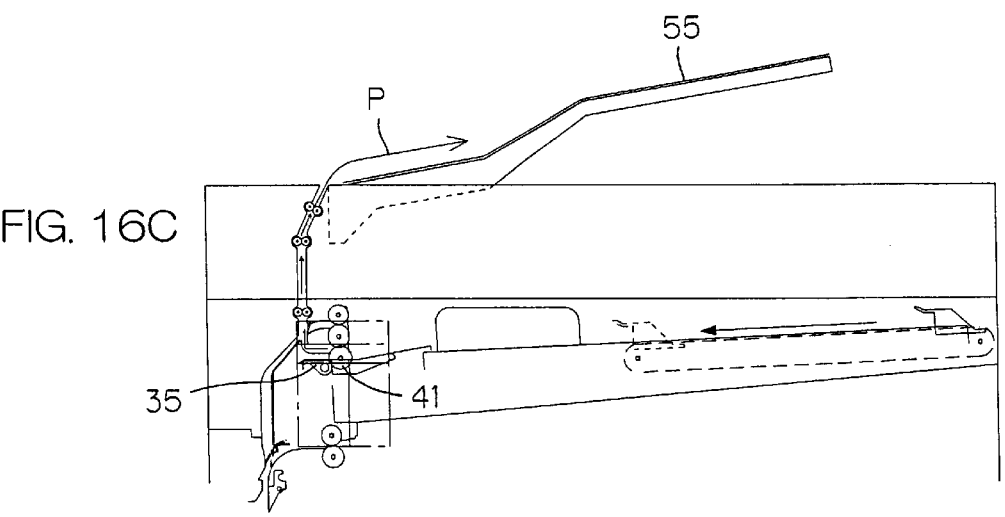
Figure 17:
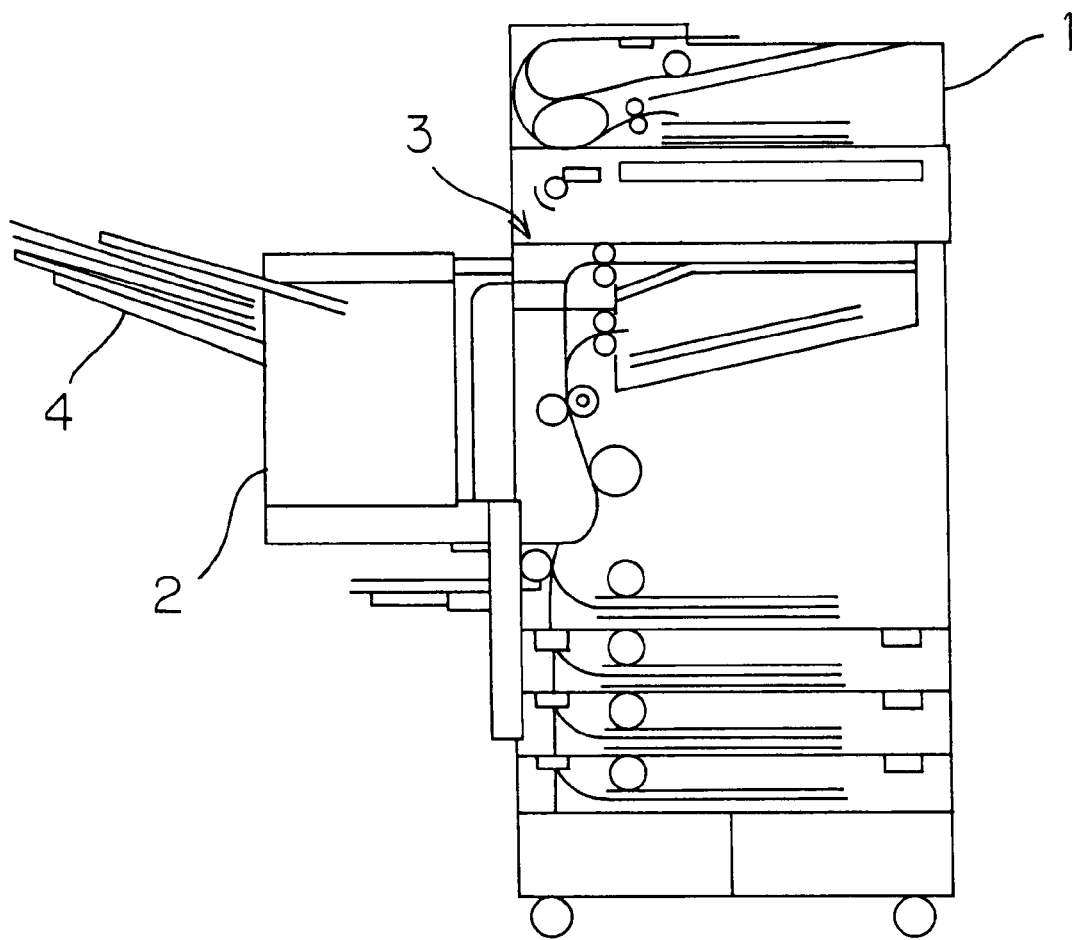
FIG. 17 is a diagram showing a coupling relationship between a conventional staple processor 2 and a main body 1 of an image forming apparatus.
Figure 18:
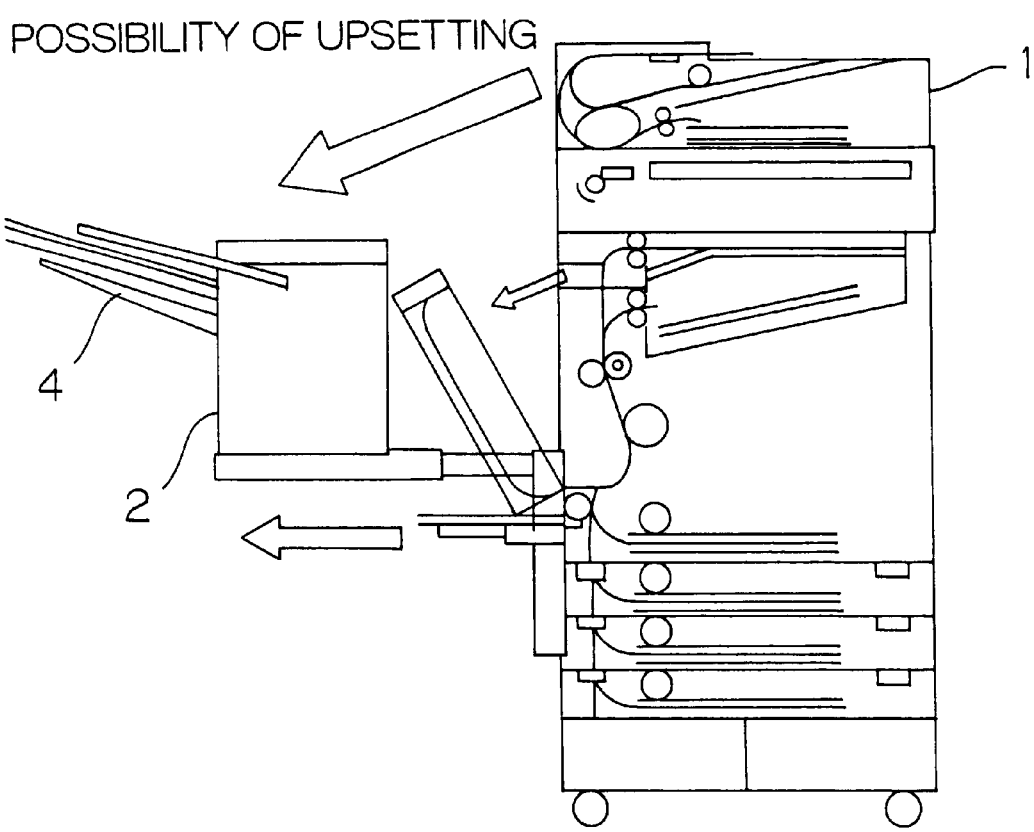
FIG. 18 is a diagram showing the state of the staple processor 2 in a case where jam processing is made in the main body 1 of the image forming apparatus.
Figure 19:
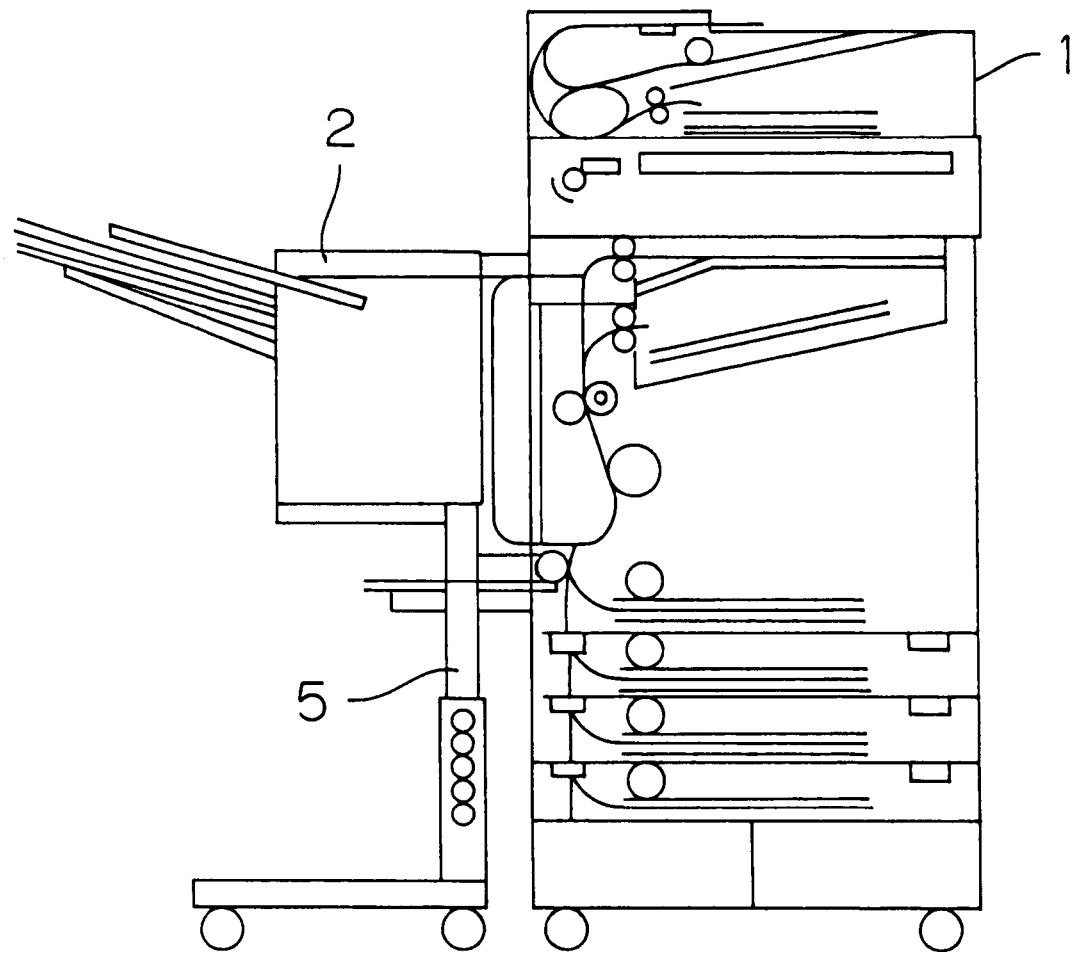
FIG. 19 is a front view showing a state where the staple processor 2 is mounted on the main body 1 of the image forming apparatus using a mounting stand 5.

When paper sheets each having an image formed thereon are not subjected to staple processing, as shown in FIG. 16A, the paper sheets are introduced into a tray 45 in a stacking space 12 by the switching claw 33.

On the other hand, when the paper sheets each having an image formed thereon are subjected to staple processing, the switching claw 33 is switched, so that the paper sheets are introduced into a tray 34 in the staple processing section 16. In this case, a claw 54 is in a state indicated by a solid line in FIG. 15.

After the predetermined number of paper sheets are stacked on the tray 34 and are subjected to staple processing, the pressure roller 41 is then displaced, so that a paper bundle which has been subjected to staple processing is interposed between the pressure roller 41 and a discharge roller, and then the stopper 35 is rotated. The claw 54 is switched to a state indicated by a broken line. Each of the rollers is rotated, so that the paper bundle which has been subjected to staple processing is discharged onto a paper receiving tray 55 on an upper surface of the main body housing 11.

The present invention is not limited to the above-mentioned embodiments, and various changes can be made in the range of the claims.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

an image forming section for forming a toner image, a transfer section for transferring the formed toner image on paper sheets, a fixing section for fixing the toner image transferred to the paper sheets, and a main body housing containing a conveying path for conveying the paper sheets such that the toner image is transferred and fixed, wherein said main body housing includes:

a staple processing section for collectively binding a predetermined number of paper sheets, on which the image has been fixed, by staples, a lower housing, an upper housing, and a connecting housing which connects the lower and upper housings, a paper stacking space which is formed between the lower and upper housing in a vertically intermediate portion of the main housing, the stacking space extending into the connecting housing and entering in an approximately horizontal direction from an outer surface of the housing, wherein the paper sheets, on which the image has been fixed, are discharged into the stacking space, the stacking space having a tray on which the paper sheets are discharged, and a paper stacking tray, arranged above the stacking space tray, for retaining paper sheets that will be stapled.

2. An image forming apparatus comprising:

an image forming section for forming a toner image, a transfer section for transferring the formed toner image on paper sheets, a fixing section for fixing the toner image transferred to the paper sheets, and a main body housing containing a conveying path for conveying the paper sheets such that the toner image is transferred and fixed, wherein said main body housing includes:

a staple processing section for collectively binding a predetermined number of paper sheets, on which the image has been fixed, by staples, a lower housing, an upper housing, and a connecting housing which connects the lower housing and the upper housings, a paper stacking space which is formed between the lower and upper housing, a paper receiving tray projecting toward one side of the main body housing, wherein the predetermined number of paper sheets, which has been subjected to staple processing, is discharged onto said paper receiving tray, and the paper sheets, which are not subjected to staple processing, are discharged into said paper stacking space.

3. The image forming apparatus according to claim 2, wherein the paper receiving tray is below the paper stacking space, and the predetermined number of sheets, which has been subjected to staple processing, is discharged onto said paper receiving tray through said paper stacking space.

4. An image forming apparatus comprising:

an image forming section for forming a toner image, a transfer section for transferring the formed toner image on paper sheets, a fixing section for fixing the toner image transferred to the paper sheets, and a main body housing containing a conveying path for conveying the paper sheets such that the toner image is transferred and fixed, wherein said main body housing includes:

a staple processing section for collectively binding a predetermined number of paper sheets, on which the image has been fixed, by staples, a lower housing, an upper housing, and a connecting housing which connects the lower and upper housings, a paper stacking space which is formed between the lower housing and the upper housing, a paper receiving tray on an upper surface of said main body housing, wherein the predetermined number of paper sheets, which has been subjected to staple processing, is discharged onto said paper receiving tray, and the paper sheets, which are not subjected to staple processing, are discharged into said paper stacking space, and paper bundle conveying means for feeding the predetermined number of paper sheets, which has been subjected to staple processing, to said paper receiving tray.

5. A staple processor comprising:

stacking means in which a plurality of paper sheets each having an image formed thereon are stacked to form a stack of sheets;

a stapler for binding the stack;

moving means for moving the stack along the stapler so that a side of the stack remains parallel to said stapler and in contact with the stapler so that the stack be bound at any desired predetermined position along the side thereof; and control means for stopping the movement of the stack, when the stack of sheets is at a predetermined position relative to the stapler, and for operating the stapler.

6. The staple processor according to claim 5, wherein said control means stops the movement of the stack by the moving means and operates the stapler at any desired predetermined position along the side of the stack.

7. The staple processor according to claim 6, wherein said stacking means, the stapler, the moving means, and the control means are contained in the main body housing of the image forming apparatus.

8. The staple processor according to claim 7, wherein said stacking means is a paper stacking space which is formed in a vertically intermediate portion of the main body housing in the image forming apparatus such that it enters the housing in an approximately horizontal direction from an outer surface of the housing and into which the paper sheets, on which the image has been fixed, are discharged.

9. A method of stapling a stacked paper sheets, comprising the steps of:

moving the plurality of stacked paper sheets while making respective one sides, which should be bound, of the paper sheets parallel to a stapler fixedly arranged;

stopping the movement of the paper sheets to operate the stapler, when positions to be bound along the respective one sides of the paper sheets are opposed to the stapler;

further moving the paper sheets, stopping the movement of the paper sheets when other positions to be bound of the paper sheets are opposed to the stapler, and operating the stapler; and repeating the movement and the stop of the paper sheets and the operation of the stapler, as required, to bind the plurality of portions of the paper sheets using the stapler along the respective one sides of the paper sheets.

* * * * *